United States Patent
Matviya

(10) Patent No.: US 6,682,667 B1
(45) Date of Patent: Jan. 27, 2004

(54) METHOD FOR PRODUCING SELF-SUPPORTING ACTIVATED CARBON STRUCTURES

(75) Inventor: Thomas M. Matviya, McKees Rocks, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 150 days.

(21) Appl. No.: 10/067,953

(22) Filed: Feb. 5, 2002

(51) Int. Cl.$^7$ .................. B29B 11/14; B29B 11/16; B29C 35/16
(52) U.S. Cl. .................. 264/29.4; 264/29.6; 264/29.7; 264/109; 264/122; 264/126
(58) Field of Search .................. 264/29.4, 29.6, 264/29.7, 109, 122, 126

(56) References Cited

U.S. PATENT DOCUMENTS

| | | |
|---|---|---|
| 3,676,365 A | 7/1972 | Shirai et al. |
| 3,825,460 A | 7/1974 | Yoshikawa et al. |
| 3,865,713 A | 2/1975 | Kawai et al. |
| 3,919,369 A | 11/1975 | Holden |
| 4,000,236 A | 12/1976 | Redfarn et al. |
| 4,148,753 A | 4/1979 | Sarjeant |
| 4,386,947 A | 6/1983 | Mizuno et al. |
| 4,399,052 A | 8/1983 | Sugino |
| 4,409,125 A | 10/1983 | Nishino et al. |
| 4,518,704 A | 5/1985 | Okabaysahi et al. |
| 4,627,857 A | 12/1986 | Sutt, Jr. |
| 4,664,683 A | 5/1987 | Degen et al. |
| 4,699,896 A | 10/1987 | Sing et al. |
| 4,753,728 A | 6/1988 | VanderBilt et al. |
| 4,859,386 A | 8/1989 | VanderBilt et al. |
| 4,999,330 A | 3/1991 | Bose et al. |
| 5,017,318 A | 5/1991 | VanderBilt et al. |
| 5,043,310 A | 8/1991 | Takeuchi et al. |
| 5,306,675 A | 4/1994 | Wu et al. |
| 5,356,852 A | 10/1994 | DeLiso et al. |
| 5,376,609 A | 12/1994 | Guile |
| 5,389,325 A | 2/1995 | Bookbinder et al. |
| 5,451,554 A | 9/1995 | Guile et al. |
| 5,488,021 A | 1/1996 | DeLiso et al. |
| 5,510,063 A | 4/1996 | Gadkaree et al. |
| 5,543,096 A | 8/1996 | Wu |
| 5,685,986 A | * 11/1997 | Yamada et al. ............ 210/498 |
| 5,714,000 A | * 2/1998 | Wellen et al. ............ 106/601 |
| 5,750,026 A | 5/1998 | Gadkaree et al. |
| 5,776,385 A | 7/1998 | Gadkaree et al. |
| 5,820,967 A | 10/1998 | Gadkaree |
| 5,976,432 A | 11/1999 | Yang et al. |
| 6,097,011 A | 8/2000 | Gadkaree et al. |

FOREIGN PATENT DOCUMENTS

| | | |
|---|---|---|
| EP | 85104931.2 | 4/1985 |
| EP | 88310555.3 | 11/1988 |
| EP | 90314386.5 | 12/1990 |
| EP | 94114070.9 | 8/1994 |
| EP | 96102660.6 | 2/1996 |
| EP | 96117659.1 | 11/1996 |
| JP | 57027130 | 7/1980 |
| JP | 55167118 A | 12/1980 |
| JP | 58064133 A | 4/1983 |
| JP | 60204610 A | 10/1985 |
| JP | 60225639 A | 11/1985 |
| JP | 62052116 A | 3/1987 |
| JP | 01009867 A | 6/1987 |
| JP | 10242010 | 9/1998 |
| JP | 10242011 | 9/1998 |
| JP | 11217278 A | 8/1999 |
| WO | PCT/US98/21870 | 10/1998 |
| WO | WO 00/78138 | 12/2000 |
| WO | WO 01/56348 | 8/2001 |

* cited by examiner

Primary Examiner—Stephen J. Lechert, Jr.
(74) Attorney, Agent, or Firm—Cohen & Grigsby P.C.

(57) ABSTRACT

A method for producing self-supporting activated carbon structures is disclosed. The method comprises the steps of mixing a granular activated carbon, a binder material, a carbonization agent, and a liquid to produce a semi-plastic mixture; compacting the mixture using compacting pressures of or greater than about 100 pounds per square inch to form a three-dimensional structure; and heating the structure to an elevated temperature of or greater than about 300° C. to produce a self-supporting activated carbon structure. The granular activated carbon is of any particle size between approximately 4 and 325 mesh U.S. Sieve Series, and the binder is a ground cereal grain, cereal rain flour or a tuber flour. The resultant structure may then be cooled to near-ambient temperatures under an essentially inert atmosphere. Such structures can exhibit good mechanical strengths, adsorption capacities nearly equivalent to those of the activated carbon used in their preparation, and appreciable electrical conductivity. Such structures can also exhibit the chemical inertness, very high temperature tolerance (>1000° C.) in non-oxidizing environments, and the elevated temperature tolerance in mildly oxidizing environments typically associated with activated carbons.

14 Claims, No Drawings

METHOD FOR PRODUCING SELF-SUPPORTING ACTIVATED CARBON STRUCTURES

FIELD OF INVENTION

The present invention relates to methods for producing self-supporting activated carbon structures and, more particularly, to the production of self-supporting activated carbon structures using inexpensive, readily available starting materials, such as granular carbon.

BACKGROUND OF THE INVENTION

Self-supporting activated carbon structures have a high degree of utility. For example, self-supporting activated carbon structures have been used as filters, catalyst supports, adsorbents, and electrodes. In some applications, electrical conductivity of the activated carbon structure is desirable for regenerative or electrochemical purposes. The shape or form of the activated carbon structure has been selected to compliment the intended utility. These shapes or forms have included cylinders, rectangular or square blocks, honeycombs, plates, thin sheets, and various other three dimensional forms.

The known methods for producing activated carbon structures can be generally classified into three groups: shaping and activating organic materials; coating a substrate with activated carbon; or combining activated carbon particles with binder to form a structure of desired shape.

In the first group, self-supporting activated carbon structures are formed by shaping selected organic materials into a structure, after which the shaped structure is carbonized and activated. Generally, these organic materials are solids or semi-solids capable of producing appreciable amounts of carbonaceous char when carbonized. Such materials tend to be synthetic, such as thermosetting resins, and thus are relatively expensive when compared to the naturally occurring feed stocks used to produce commercial granular and pulverized activated carbons. Limited amounts of activated carbon particles may be added to the organic material prior to shaping to improve the adsorption properties (i.e. "activity") of the resultant formed structure. Various other fillers can also be added to the organic material prior to shaping to provide additional strength or porosity to the resultant formed structure.

Shaping of the structure can be performed by pressing, molding, or extrusion, for example. The carbonization and activation are practiced using methods known in the art. It is expected that carbonization and activation of such structures would have to be conducted at relatively slow rates (i.e., low temperatures or slow changes in temperature) to prevent cracking of the formed structure and to insure that a uniform degree of activity (i.e., adsorptive pore volume or adsorptive capacity) is developed throughout the structure. Slow process rates, due to slow heating or slow activation of the structure, are inherently more costly as longer furnace residence times are required. Longer furnace residence times inherently result in higher product costs. Even using slow rates, it is expected that it would be very difficult to produce a structure that has a uniform degree of activity (i.e., adsorptive pore volume or adsorptive capacity) throughout the resultant carbon structure because the requisite uniform heat and mass transfer throughout the structure is exceedingly difficult to establish and/or maintain at temperatures sufficient to provide other than very slow activation rates. Also, the properties of the resultant activated carbon are restricted to those that can be developed from the starting organic material and to the limited degree of modification imparted by the addition of activated carbon particles or other fillers. The economics of producing activated carbon structures by this method are very unfavorable even though electrical conductivity of these structures could be potentially high.

In the second group, activated carbon structures are formed from a non-carbon material substrate which is subsequently coated with activated carbon. Typically, the activated carbon coating is applied both on and throughout the structure, including intrastructural surfaces that define larger pores and void volumes. Several types of approaches have been used to achieve the desired activated carbon coating.

In one approach, a binder/activated carbon mixture can be coated onto the surface of a support structure. Useful binders are those that adhere well to both the support material and the activated carbon. For example, thermoplastic resins and hot melt adhesives can be used to fix an activated carbon coating to a support material. However, caution has to be exercised in selecting the binder so that the binder does not fill or prevent access to the activated carbon adsorption pore space. Alternatively, in another approach, an organic material capable of producing appreciable amounts of carbonaceous char when pyrolyized is coated onto the surface of the structure. Following this coating, the organic material is carbonized and activated. It is generally desired to produce a uniform, continuous layer of carbon on the surface of the structure using this approach. Such a layer has been found to provide good electrical conductivity and structural integrity. In another approach, the organic material of the previous approach is combined with activated or non-activated carbon particles that are typically of very small size. The surface coating is then carbonized and activated. For all three approaches, coatings can generally be applied to support structures that can tolerate the selected process conditions and coating materials without significant degradation. Typically, the support structures are ceramic.

Although these approaches may result in uniform carbon coatings of good activity and utility, the mass and volume based adsorptive capacity of the structure is limited. That is, activated carbon is present as only a surface coating and no adsorptive capacity is claimed for the underlying support material. Therefore, both the mass and volume based adsorptive capacity of the structure are limited by the support material which adds both appreciable volume and mass to the structure without corresponding increases in the structure activity. Moreover, thermosetting resins, or precursors to such resins, are favored organic coating materials. Such resins may have toxicological and/or economic issues associated with their use that can make their application difficult and/or expensive. Additionally, the range of properties of the activated carbons derived from these materials is limited as such properties are largely related to the starting materials. Also, the requisite activation of these materials typically would be best performed under very mild conditions to ensure uniform activation throughout the structure. That is, mild activation conditions are required to prevent the formation of a highly activated carbon on the outer surface of the structure while the carbon in the interior of the structure is only marginally, if at all, activated. The use of such mild conditions increases activation furnace residence times, decreases production rates and leads to substantially increased production costs.

Furthermore, the support material used in preparing activated carbon coated structures of the second group is generally not electrically conductive. Therefore any electrical conductivity associated with these structures is dependent on the conductivity of the carbon coating. Obviously, if high electrical conductivity is desired, care must be exercised that this coating provides for continuous carbon contact throughout its surface coverage.

In the third group, activated carbon structures are produced by bonding activated carbon particles into the desired shape by use of a binder. The method of this group can offer inherent advantages over the methods taught in the first two groups including significantly improved production economics, a greater range of usable and achievable activated carbon activities, greater volumetric structural adsorption capacity, greater structure mass-based adsorption capacity and, sometimes, improved structure electrical conductivity.

Generally, this method utilizes powdered activated carbons, but fibrous activated carbons have also been used. Occasionally, very small mesh (i.e., less than about 80 mesh U.S. Sieve Series size) carbons are formed into structures. There are few instances where activated carbons of larger mesh sizes have also been formed into activated carbon structures. The carbon particles are bound using one or more of many different types of binders to form a rigid structure. The actual binding method employed is dependent on the properties of the selected binder.

For example, thermoplastic binders can be heated or solvent softened to become adhesive. In this manner neighboring carbon particles are bonded by these thermoplastic adhesives such that the desired structure is maintained after forming and solvent removal or cooling. In the case of binders such as clays or ceramic precursors, water is typically used as a solvent to make a plastic mass in combination with the activated carbon. After forming and drying, the carbon particles are held in a matrix of the binder. For both types of binders, the structure is formed using techniques such as extrusion, molding, pressing, and the like. It is not uncommon for various agents to be added to the activated carbon—binder mix prior to forming to increase the plasticity of the mix which aids in the forming of the desired structure.

Thermosetting resins have also been used as binders. These binders have been mixed with activated carbon particles, the desired structure formed, and the resin cured. Sometimes other binders are used in combination with the thermosetting resins.

Other binders that have been used for forming activated carbon structures include epoxies, polyvinyl alcohol, starches, chemically modified celluloses, monosaccharides, disaccharides, polysaccharides, various fluoropolymers, and the like, alone or in combination with other binders. Often, these and other binders are used in conjunction with a liquid, which may have solvating properties, in order to form a plastic or semi-plastic, moldable mass capable of being easily formed into the desired structure. Despite the variety of binders that have been used, it has not been known to use ground cereal grains, cereal grain flours, or tuber flours. After forming, the liquid is removed from the structure at which point the structure becomes rigid.

To effectively use these binders, care must be taken so that the adsorptive capacity of the bonded activated carbon (i.e., the carbon's "activity") is not significantly reduced by the binder. Reductions may occur due to excessive binder coating of the activated carbon particles. Such excessive binder coatings could effectively seal the surface of the activated carbon particles so that adsorption can not occur due to transport limitations. Adsorption of the binder by the activated carbon could also lead to reduced activity. For example, in the case of solvent softened binders, use of excess solvent may dissolve some of the binder. Solvated binder may then be adsorbed by the activated carbon, lowering its adsorptive capacity. Such capacity lowering is expected to be a particular problem when high adsorption capacity activated carbons are bonded.

It is also important that the binder does not greatly increase the mass or volume of the activated carbon structure. Typically, the greater the proportion of binder in the structure, the greater the mechanical strength of the structure. Unfortunately, the proportion of the structure volume and mass attributable to the binder increases with increased binder usage. Such increases can significantly degrade the apparent mass or volume based adsorptive capacity of the structure by effectively diluting the contribution of the activated carbon. Excessive binder use can also significantly decrease the internal void volume of the activated carbon structure. This in turn can lead to the structure exhibiting high resistance to flow or poor adsorption kinetics.

Typically, the applicability of these types of activated carbon structures is limited by the properties of the binder. For example, activated carbon structures utilizing solvent softened binders can not be used in the presence of solvents that may resoften or dissolve the binder. Likewise, structures utilizing thermoplastic binders can not be used at temperatures at or above the softening point of the binder. Cured thermosetting resins in some ways mitigate these types of problems. Unfortunately, these types of resins are inherently costly, may have toxicological issues associated with them, or may be in a physical form that is difficult to use or that may result in adsorption of the binder and subsequent activated carbon activity loss. Additionally, the electrical conductivity of structures produced using these types of binders are expected to be very low due to the limited contact between carbon particles in such structures and to the insulating properties of the selected binders.

These types of limitations are well known and a variety of techniques have been disclosed in an effort to broaden the applicability of activated carbon structures produced using such binders. For example, in some teachings the formed activated carbon structure is subjected to elevated temperatures to further harden or set the binder or to partially or fully carbonize or calcine the binder. Treatments such as carbonization and, especially, calcination of a carbonizable binder are expected to substantially increase the electrical conductivity of the treated activated carbon structure.

Such thermal treatments can make formed activated carbon structures more resistant to the effects of various solvents and/or elevated temperatures. Typically, however, thermal treatments such as carbonization or calcination partially volatilize the binder resulting in decreased mechanical strength. This is particularly true if calcination is performed at the high temperatures necessary to obtain appreciable electrical conductivity. This loss of strength can be compensated for by increasing the amount of binder used in the structure. But, use of additional quantities of binder correspondingly increases the costs associated with use of the selected binder, and may make the resultant structure prohibitively expensive. Furthermore, the use of additional quantities of binder may also lower both the mass and volume activity of the resultant structure. Also, some binders, such as some thermosetting resins, typically do not form porous chars. Therefore, increased use of these types of binders, even when carbonized or calcined, may severely limit transport within the activated carbon structure.

It would seem that the difficulties typically associated with the use of binders for forming activated carbon structures could be avoided if a suitable method for binderless bonding of activated carbon particles could be identified. Due to the chemical nature of activated carbon, such binderless bonding would be expected to be very difficult if not impossible. However, teachings have been documented that describe the forming of a body from activated carbon particles by use of a specialized sintering technique. The utility of such teachings is not certain, but it would be reasonable to expect the energy demands of such a technique would be so excessive as to make its practice economically prohibitive.

For purposes of this specification, certain terms will be taken to have the following meanings with respect to the thermal processing of carbon-based materials. "Carbonization" shall mean the conversion of a carbon containing organic material into a higher carbon content material, usually referred to as a char. Carbonization is usually performed by exposing the organic material to elevated temperatures, typically under a relatively inert or mildly oxidizing atmosphere. Such exposure serves to eliminate a high proportion of the heteroatoms, such as oxygen, hydrogen, nitrogen, and sulfur which may be contained in the organic material. Such heteroatoms are typically eliminated as volatile gases which are usually composed of compounds such as water, carbon monoxide, carbon dioxide, nitrogen oxides, and volatile sulfur compounds. Chemical condensation of the non-volatile carbon species to form a char occurs simultaneously with this elimination of volatile material. Carbonization temperatures are typically greater than 100° C. and less than 500° C. Although, typically, carbonization is essentially complete at temperatures of approximately 500 to 600° C., additional amounts of volatile material may be emitted from the char if the char temperature is increased to higher values.

"Calcination" shall mean the exposure of a material to elevated temperature. These elevated temperatures are usually assumed to be greater than about 600 or 700° C. but can be lower. For oxidizable materials, such as carbon, calcination is usually practiced under an inert atmosphere. Carbonization of a material must occur before, or simultaneously, with calcination. For example, consider an uncarbonized organic material placed into a furnace operating at 800° C. As the material heats to 800° C. it becomes carbonized. After reaching the 800° C. temperature, it becomes calcined at that temperature. In such situations where carbonization and calcination are practiced as essentially one process step, and carbonization of the material is inherent to the process step, the term calcination can be applied to the collective operation. The term pyrolysis can also be applied to this type of collective operation. During the initial calcination of a carbonized material, limited amounts of volatile material may be given off as gases and increased chemical condensation of non-volatile carbon species may occur. Such occurrences may continue as the calcination temperature is increased and can be considered as essentially non-reversible and complete. That is, subsequent calcination at a given temperature of a carbon previously calcined at that temperature will not result in any significant additional emission of volatile material or chemical condensation. It should be noted that a given material can be carbonized only once but can be calcined as many times as desired.

"Activation" shall mean the exposure of carbon to oxidizing gases such as water vapor or carbon dioxide at temperatures typically greater than about 700° C. to selectively gasify a portion of the carbon. For granular and many other types of activated carbons, this selective gasification typically occurs both on the surface and the interior of the individual carbon granules. Such selective gasification results in the development of adsorptive pore volume. This adsorptive pore volume, and its associated magnitude, is often referred to as "activity." The occurrence of significant amounts of such "activity" is the defining characteristic of activated carbons.

As can be surmised from the foregoing, no method has yet been disclosed for producing self-supporting activated carbon structures, especially from granular activated carbons, that is totally satisfactory. Accordingly, it is an object of the present invention to provide an improved method for producing self-supporting activated carbon structures that provides cost and performance advantages through the use of relatively inexpensive, readily available starting materials and short production times. It is an object of the invention to use inexpensive granular activated carbon in combination with novel, non-toxic binders, and carbonization agents which can be of relatively low toxicity. It is a further object of the present invention that the carbonization agents accentuate the utility of the selected binders. It is also an object of the present invention to provide a process that does not require an activation process step, thus eliminating a cost burden incurred with some of the prior art.

Additionally, it is an object of the present invention to provide activated carbon structures that have uniform carbon activity, and a packed density of bonded activated carbon granules that can approach or equal that of the unbonded granular activated carbon. It is a further object of the present invention to provide self-supporting activated carbon structures that are capable of withstanding exposure to temperatures above 300° C., in non-oxidizing environments, and that have a chemical inertness associated with activated carbon and electrical conductivities which can approach or exceed that of packed beds of the granular activated carbon used in its preparation. Other objects and advantages will become apparent from descriptions of the invention.

SUMMARY OF THE INVENTION

Generally, the present invention comprises a method for producing self-supporting activated carbon structures (also referred to herein as "SSACS") using granular activated carbon. The method comprises (a) mixing a granular activated carbon, a binder material, a carbonization agent, and a liquid to produce a semi-plastic mixture; (b) compacting said mixture using compacting pressures of about or greater than about 100 pounds per square inch to form a three-dimensional structure; and (c) heating the structure to an elevated temperature of greater than or about 300° C. under an essentially inert atmosphere to produce SSACS. Optionally, the structure is dried following compaction and before being heated at elevated temperatures. After heating, it is preferred to cool the SSACS to less than about 300° under an essentially inert atmosphere.

In the first step, the granular activated carbon preferentially has a particle size that will pass through an approximately 4 mesh sieve and be retained on an approximately 325 mesh sieve, according to U.S. Sieve Series, ASTM Specification E-11-61. Such measurement is also commonly represented as 4×325 mesh. It is expected that granular non-activated carbons, chars, and graphite could also be used in the practice of the invention. The teachings of the present invention are also expected to be selectively applicable to fibrous, pelletized, and pulverized carbons, chars, and graphites.

The binder material includes ground cereal grain, cereal grain flour or tuber flour; or a mixture thereof. Alternatively, a polysaccharide, such as chitin, various gums, or a chemically modified cellulose could potentially be used as a binder. Preferably, the binder comprises a cereal grain flour or a tuber flour. More preferably, the binder is wheat flour or potato flour. The mass-based ratio of binder to activated carbon is greater than 1 part binder to 5 parts carbon. In a preferred embodiment, a ratio of 3 to 4 parts binder to 5 parts activated carbon is used. The carbonization agent includes any agent that will increase the yield (amount) of carbon obtained from a carbon-containing material subjected to carbonization excluding zinc chloride. Preferred carbonization agents are those that exhibit a lower toxicity and include ammonium chloride and diammonium hydrogen phosphate. Mixtures of two or more carbonization agents may be used.

An effective amount of liquid is used to wet both the carbon and the binder material. Preferably, the liquid also softens the binder. In a preferred embodiment, the liquid is also capable of solvating the carbonization agent. More preferably, the carbonization agent is dissolved in this liquid prior to mixing with the activated carbon and binder. A suitable liquid should not react with the carbon, binder or carbonization agent, and should be somewhat volatile such that it can be evaporated from the wet formed activated carbon structure without undergoing decomposition. Water is the preferred liquid.

In the second step, the mixture is compacted using pressures of greater than or about 100 pounds per square inch to form a configuration of the desired three-dimensional structure. In another embodiment, the structure is dried following compaction. In the third step, the structure is heated to an elevated temperature under an essentially inert atmosphere to produce the SSACS. The elevated temperature is greater than or about 300° C. Preferably, the elevated temperature is greater that about 500° C.; most preferably, the temperature is greater than about 900° C. In an optional fourth step, the structure is cooled to less than about 300° C. under an essentially inert atmosphere.

The resultant self-supporting activated carbon structures can be produced in essentially any three-dimensional shape. These structures can be thermally and chemically stable and homogenous; and exhibit good mechanical strengths, appreciable electrical conductivity, adsorption capacities nearly equivalent to those of the activated carbon used in their preparation, and bonded activated carbon packing densities approaching or equaling those of the unbonded granular activated carbon from which they are constructed. For example, the activated carbon in these structures can retain adsorption capacities as much as 90% or greater of its original unbonded adsorptive capacity. If heated to a sufficiently high temperature during preparation, such structures can also exhibit electrical conductivities superior to those exhibited by a packed bed of the unbonded granular activated carbon used in the preparation of the self-supporting activated carbon structures. Such structures can also exhibit the chemical inertness, very high temperature tolerance (>1000° C.) in non-oxidizing environments, and the elevated temperature tolerance in mildly oxidizing environments typically associated with activated carbons.

The SSACS produced by use of the present invention can be of any form including, but not limited to, cylinders, square or rectangular blocks, honeycombs, plates, thin sheets and various other three-dimensional forms. A potential limitation to these various forms includes the minimum structure thickness in that it should equal or exceed the maximum diameter of the granular activated carbon particles used in the preparation of the SSACS. SSACS can prove useful for various applications, such as adsorbents and/or filters for the removal of contaminates or other materials and compounds from gases, vapors or liquids. These self-supporting activated carbon structures can be prepared such that they exhibit appreciable electrical conductivity. Therefore, these structures can have utility as resistance heaters, as electrically regenerative adsorbents, or as electrodes for use in electrochemical processes and/or applications. Such electrochemical processes and/or applications can include, but are not limited to, batteries, capacitors, electrochemical metal recovery/removal, electrodeionization, and electrosynthesis.

Other features, aspects and advantages of the present invention will become better understood or apparent from a perusal of the following detailed description and examples of the invention and appended claims.

DETAILED DESCRIPTION OF THE INVENTION

In an embodiment of the present invention a method for the production of SSACS comprises (a) mixing granular activated carbon, a binder material, a carbonization agent, and a liquid to produce a semi-plastic mixture having an essentially uniform consistency; (b) compacting the mixture using compacting pressures of about or greater than about 100 pounds per square inch to form a three-dimensional structure; and (c) heating the structure to an elevated temperature of greater than or about 300° C. under an essentially inert atmosphere to produce SSACS. Optionally, the structure is dried following compaction and before exposure to elevated temperatures. Optionally, the heating step may be followed by a cooling step (d) wherein the SSACS is cooled to less than about 300° C. under an essentially inert atmosphere.

In the first step of an embodiment of the present invention, granular activated carbon and a binder material are combined in amounts so the mass combination contains greater than about 1 part binder for each five parts activated carbon. Preferably, 5 parts of carbon are used for each 3 to 4 parts of binder. Liquid is then added in an amount sufficient to wet both the carbon and binder and, preferably, also soften the binder. A carbonization agent is then added to the mixture. More preferably, the carbonization agent has been dissolved in the liquid prior to adding the liquid to the carbon and binder. The liquid, carbonization agent, carbon and binder are mixed until a minimally semi-plastic mass of uniform consistency is obtained.

In the second step, the semi-plastic mass is compacted, using known molding, extrusion, or other forming technologies to produce the desired structural configuration. Preferably, after compaction, the wet formed material is dried. In the third step, the formed material is heated, preferably in an inert atmosphere, to a temperature greater than or equal to approximately 300° C. The resultant activated carbon self supporting structure is subsequently cooled to less than about 300° C. in an essentially inert atmosphere.

Useful granular activated carbons are commonly available granular activated carbons and may be derived from any appropriate starting material such as, for example, coal, wood, coconut shell, other nut shells, fruit pits or olive stones. The granular activated carbons preferably have a particle size between about 4 mesh and about 325 mesh. Generally, particle sizes greater than 3 mesh are not available. Particle sizes averaging less than approximately 325 mesh are generally classified as pulverized carbons.

In a preferred embodiment of the present invention, the granular activated carbon has an average particle size less than 10 mesh and greater than 325 mesh. For example, activated carbons having nominal mesh sizes, such as 10×20, 12×20, 12×40, 40×80, 80×325, or 10×325 mesh, can all be used. Activated carbons having particle sizes of 4×40 mesh, for example, are preferred if the average particle size is less than about 10 mesh. Activated carbons having average particle sizes greater than 10 mesh (i.e., 4 to 10 mesh) can be used although the mechanical properties and appearance of the resulting SSACS are improved if these larger mesh carbons are used in combination with smaller mesh (i.e., 10 to 325 mesh) granular activated carbons. With respect to the mechanical strength and appearance of the resultant SSACS, smaller average mesh sizes are preferred.

Some pulverized activated carbons may be used with the present invention, but difficulties may be encountered. For example, the resulting SSACS may crack upon drying or heating to elevated temperatures. This cracking can be avoided in some instances if one or more of the dimensions of the resulting SSACS are minimized. Therefore, thin sheets, pellets, pills, and the like can sometimes be prepared from pulverized carbons by use of this method. It is also expected that fibrous and/or pelletized activated carbons would also work. However, the high cost typically associated with such forms of activated carbon would likely preclude their use in favor of the granular activated carbon. It is also expected that granular non-activated carbons, chars, and graphite can be used to produce SSACS by the method of the present invention.

The granular activated carbons usable in the present invention can exhibit any of the available adsorptive capacities (i.e., "activities"). Granular activated carbons of very high or very low activities can be utilized to produce self-supporting structures by this method. The method of this invention is such that the activity of the activated carbon is significantly retained even after incorporation into a SSACS. Furthermore, once formed and thermally treated, it is expected that the activated carbon structure can be further activated using procedures and conditions well know in the related art. However, further activation is not required or even desired, to restore or increase the adsorptive capacity of the incorporated activated carbon, as it is typically costly and time consuming. Such further activation may also degrade the physical integrity of the binder-derived char thereby weakening the SSACS. Thus, it is preferable in the present invention, to employ a granular activated carbon that exhibits sufficient activity so that the resulting SSACS exhibits the desired adsorptive capacity without having to resort to further activation.

These granular activated carbons can exhibit any available density. There is no preferential range or limit with respect to the densities of the granular activated carbons suitable for use in the present invention. It should be noted, however, that lower density carbons typically exhibit reduced levels of mechanical strength and electrical conductivity. These reduced levels in the granular activated carbon may result in reductions in the associated properties of the resultant SSACS.

Binder materials include ground cereal grains, cereal grain fours and tuber flours. Preferably the material is pulverized, commonly referred to as "flours" and known to be relatively inexpensive. In an embodiment of the present invention, flours were found to produce SSACS superior to those created with ground binders having larger particle sizes. Cereal grains include, but are not limited to, wheat, corn, rye, oats, rice, and barley. Tuber flours include potato flour. Preferably, the binder is wheat flour or potato flour. A few of these materials exhibit a limited tendency to swell or foam during carbonization. This swelling or foaming can be inhibited or eliminated by the use of appropriate amounts of a carbonization agent. As these types of materials are commonly utilized as foodstuffs, their use as binders should not present any significant toxicological issues.

While a variety of other types of binders may be used, they are not expected to be as beneficial as the present disclosed binder materials because they may result in higher costs, present toxicological issues and/or lack an ability to be wet by the selected liquid. Such other types of binders can include those materials generally classified as polysaccharides or chemically modified polysaccharides. Examples include, but are not limited to, chitin, various gums, methyl cellulose, or carboxymethyl cellulose. Any binder should be capable of being wet by the selected liquid to form a mixture and exhibit limited solubility in the liquid selected for wetting of the carbon and binder. Limited solubility is advantageous as the binder then stays localized on the surface(s) of the granular activated carbon. Thus, penetration of the binder into the carbon granules is largely prevented and blocking or filling of the activated carbon adsorption sites is inhibited. Additionally, usable binders should exhibit little or no swelling when exposed to the elevated temperatures in the presence of a selected carbonization agents. It has been found that the polysaccharides commonly referred to as starches are not suitable binders for the practice of this invention due to excessive swelling tendencies.

The liquid used in a preferred embodiment of the invention is capable of both wetting the carbon, and wetting and softening the binder. This "wetting liquid" is non-reactive with the carbon, binder or carbonization agent and is also somewhat volatile such that it can be evaporated from the wet formed activated carbon structure without undergoing any type of decomposition. It is advantageous that the wetting liquid be capable of solvating the selected carbonization agent in quantities such that the wetting liquid can act as a vehicle for the even distribution of the carbonization agent through and in the activated carbon-binder mixture. Such a wetting liquid-carbonization agent solution may be termed a "wetting solution." Furthermore, it is desirous that the wetting liquid be inexpensive and have little or no toxicological or other safety issues associated with it's use. Preferably, the wetting liquid is water.

The carbonization agent includes any agent that will increase the yield of carbon obtained from a carbon-containing material subjected to carbonization excluding zinc chloride. Preferably, the present invention uses carbonization agents that exhibit a lower toxicity such as ammonium chloride and diammonium hydrogen phosphate. The novel use of such carbonization agents in the practice of the present invention provides for an increase in the char yield and strength of the SSACS from a given amount of binder without any corresponding significant increase in char volume. Thus, the amount and effectiveness of the char binder in the SSACS is increased without the requisite increase in binder volume that would be incurred by the other methods known in the art. Moreover, such increases provide for high activated carbon densities. Additionally, the porous binder char resulting from the action of the carbonization agent on the binder material preserves access to the adsorption sites of the activated carbon in the SSACS. This result is in contrast to the prior art where increased SSACS binder content may seriously inhibit the transport of adsorbates to the activated carbon.

Generally, carbonization agents are used to increase the yield of carbon obtained from a carbon containing material subjected to carbonization for the preparation of activated carbons. There is also some evidence to suggest that the properties of the chars produced by the use of carbonization agents differ from those obtained without the use of these agents. Commonly, carbonization agents are applied to highly oxygenated carbon-containing materials such as low rank coals, celluloses, sugars, and other polysaccharide materials to improve charring yields. The specific methods by which such carbonization agents function to increase carbonization yields are not certain. Such agents can accentuate the chemical dehydration or lower the carbonization temperature of the carbon-containing materials to which they are applied. Also, some of these agents could significantly promote a molecular cross-linking during carbonization that incorporates the anionic portion of the agent and can even result in chars having improved strengths. Such cross-linking carbonization agents include phosphoric acid, ammonium salts of phosphoric acid, and boric acid, for example. Non-cross-linking agents include anhydrous hydrogen chloride, anhydrous hydrogen bromide, anhydrous hydrogen iodide, ammonium chloride, ammonium bromide, ammonium iodide, sulfuric acid, sulfur trioxide, and ammonium sulfate. These carbonization agents can be used alone or in combination.

It is expected that any non-gaseous carbonization agent, with the exception of zinc chloride, can be used in the practice of the present invention. However, many of these carbonization agents are severely corrosive or otherwise have significant safety or toxicological concerns associated with their use. Also, some agents may introduce residuals into the resultant carbon which may preclude its use in some applications. An object of this invention is to provide a method that has minimal toxicological issues associated with it. Therefore the preferred carbonization agents for use in this invention are ammonium salts of phosphoric acid, ammonium chloride, ammonium bromide, ammonium iodide, and ammonium sulfate. Phosphoric acid is not as corrosively aggressive, nor does it have as significant toxicological concerns as do some of the agents listed in the preceding paragraph. Thus, phosphoric acid, in relatively dilute solutions, is a preferred carbonization agent in the present invention. Gaseous carbonization agents would also be expected to aid in the carbonization of the binders used in the present invention, but may be difficult to use as extensive modification to the method may be required. Therefore, the use of gaseous carbonization agents is not recommended.

The use of phosphoric acid and ammonium salts of phosphoric acid as carbonization agents can result in an improvement in the strength of the SSACS compared to other carbonization agents. However, phosphate anion agents may leave phosphate residues in the resulting SSACS. For some applications, such residues should be removed by washing, prior to use of the SSACS. On the other hand, it is expected that the use of ammonium halide salts as carbonization agents would not contribute significant residue to the product SSACS. Based on a variety of safety, toxicological, effectiveness and economic considerations, ammonium chloride is the most preferred carbonization agent for SSACS that must have minimal carbonization agent derived contamination. Where such contamination issues are not a concern, diammonium hydrogen phosphate is the most preferred carbonization agent. In any event, the present invention provides for the use of any of a number of carbonization agents so that concerns with respect to carbonization agent residuals in the final SSACS can be minimized.

In practice, the granular activated carbon, wetting liquid, carbonization agent and binder are mixed until a uniform semi-plastic mass is obtained. A semi-plastic mass means that the mixture will have some cohesiveness and be deformable with applied pressure while still maintaining this cohesiveness. It is generally not desired that the mixture be fully plastic and readily deform with minimal pressure to any shape. Such fully plastic mixtures can be used but it may be difficult to maintain the desired structural shape prior to drying and/or carbonization/calcination. Component mixing can be accomplished using any of the related methods know in the associated arts, however the following method is preferred.

In a preferred embodiment of the present invention, first, the carbonization agent is dissolved in the wetting liquid to form a wetting solution. The wetting liquid is preferably water and the concentration of the carbonization agent in the wetting solution is typically in the range of 10 (weight) percent. Higher and lower concentrations of carbonization agent may be used. The optimum amount of carbonization agent is dependent on the desired properties of the resultant SSACS and is determined by the amount of binder used in the mixture and the volume of wetting solution taken-up by the granular activated carbon. This optimum amount can be most readily identified by the preparation of SSACS using different concentrations of carbonization agent in the wetting solution and identifying those concentrations that optimize the desired SSACS characteristics. The use of the wetting solution, rather than adding the wetting liquid and carbonization agent individually to the carbon geneally results in a more uniform distribution of the carbonization agent. This more uniform distribution in turn results in a SSACS of more uniform composition and properties.

Once prepared, the wetting solution is combined with the granular activated carbon. The amount of wetting solution used is dependent on the porosity and rate of wetting of the activated carbon and the amount of binder that will be subsequently added to this mixture. If necessary, the wetting solution-carbon combination may be mixed to insure that all of the carbon granules are uniformly wet by the wetting solution. It is not uncommon to observe relatively small amounts of uncombined wetting solution at this stage in the method. Next, the binder material is added to the wetting solution-granular activated carbon mixture. It will be observed that the binder immediately sticks to the surfaces of the carbon granules. This combination is mixed until each carbon granule is uniformly coated with the binder and the binder is evenly dispersed throughout the carbon. Any type of mixing method known in the associated arts may be used providing such mixing method does not seriously degrade the granular activated carbon particles. Mixing times are typically a few minutes or less. At this point the mixture should tend to clump and be semi-plastic. The coated carbon granules may appear damp. Uncombined wetting solution should not be apparent.

For most granular activated carbons, 2 to 5 parts (weight based) of binder can be used for every 5 parts of granular activated carbon. Binder amounts less than about 2 parts generally result in SSACS lacking sufficient mechanical integrity. Binder amounts greater than 5 parts can be used but such levels are usually excessive and only marginally improve, if at all, the resultant SSACS properties. Typically, acceptable SSACS characteristics are usually obtained using 3 to 4 parts of binder. Maximum activated carbon densities in the resultant SSACS, and minimal SSACS shrinkage resulting from carbonization/calcination of the binder, are obtained when the amount of binder is minimized.

Although various other mixing procedures may be used, this mixing method is thought to have certain advantages. For example, the application of the dry binder to the wet granular activated carbon readily provides for a relatively uniform binder coating on each carbon granule. Furthermore, it is thought to inhibit adsorption by the activated carbon of soluble materials dissolved from the binder. Also, this method is expected to provide for the most efficient use of the wetting solution.

Once the wetting solution-granular activated carbon-binder mixture is prepared it is formed by compaction to the desired shape. Compaction and forming can be performed using the techniques and technologies familiar to those skilled in the associated arts. These techniques can include compaction of the mixture into a cavity of a hollow forming die or mold. Alternatively, the mixture may be extruded using various known techniques. During forming, sufficient pressure should be applied to the semi-plastic mixture to eliminate any entrained air pockets or large void spaces such that the SSACS will have a structure of relatively uniform density. Optimally, it is thought that sufficient pressure should be applied during forming such that the semi-plastic wet binder is forced from the intersections of the carbon granules and these granules essentially touch. The use of excessive amounts of binder or wetting liquid can prevent such carbon to carbon particle contact. The result of the use of such excessive amounts of binder or wetting liquid could be reduced SSACS strengths, densities, or electrical conductivity.

Higher compaction pressures can be applied if SSACS of higher density are required but crushing of the individual carbon granules may occur. Generally, it is desirous that the applied pressure not exceed that required to crush the individual carbon granules. Such crushing may result in SSACS having reduced internal transport characteristics. Typically, pressures of 200 to 600 pounds per square inch (psi) have been found to be satisfactory for bituminous coal based granular activated carbons. Other types of granular activated carbons may crush at different pressures. Pressures lower than about 200 psi can result in SSACS having limited mechanical strength. Compaction pressures higher than 600 psi can be used but crushing of the individual carbon granules may result. While applying pressure to the mixture during forming, especially when using forming dies, the observation of uncombined wetting solution can serve as an indication that the amount of this solution in the mixture was too high and should be reduced. Similarly, the observation of uncombined wet binder may indicate the binder level of the original mix was too high and should be reduced.

Once the mixture has been appropriately formed into the desired structure, the SSACS is optionally dried. This drying removes the wetting liquid (typically water) and eliminates the semi-plastic nature of the SSACS, which becomes rigid and typically exhibits appreciable mechanical strength. Drying of the SSACS can be by any known method providing that the SSACS is not mechanically degraded during the drying process. Suitable methods could include, but are not limited to, air drying, oven drying at elevated temperatures, vacuum drying, or freeze drying. Preferred drying temperatures are approximately 100° C. when water is used as the wetting liquid. Higher or lower temperatures can be used. At approximately 100° C., some combinations of carbonization agent and binder will result in partial carbonization of the binder. At higher drying temperatures, this carbonization may become more severe. But, even if partial or full carbonization occurs, such carbonization is not expected to impact the final properties of the SSACS. Following drying, the SSACS is heated at temperatures greater than or equal to about 300° C. under essentially inert or otherwise nonoxidizing conditions. It is desirous that such heating be performed under essentially inert or otherwise nonoxidizing conditions, including the contacting atmosphere, to prevent oxidation and the associated gasification of the SSACS. Such oxidation and gasification can result in poor appearance and reduction in the mechanical integrity of the resultant SSACS.

Alternatively, the drying step can be eliminated and the wet SSACS directly heated to temperatures greater than approximately 300° C. Care must be taken, however, if the drying step is eliminated. The wet SSACS contains appreciable amounts of the volatile wetting liquid. Also, the SSACS will evolve appreciable quantities of gaseous material when heated to elevated temperatures. Such gaseous material can include by-products from the calcination of the carbonization agent and volatile material released from the binder during carbonization/calcination. If the SSACS is prepared such that it has a very dense structure and the increase to carbonization/calcination temperatures is rapid, the interior of the SSACS can experience a significant increase in pressure due to the rapid evolution of gaseous materials. Such a pressure increase can literally cause the SSACS to violently explode.

The maximum temperature at or above about 300° C. to which the SSACS is heated is selected with respect to the desired properties of the final product SSACS. It is thought that significant carbonization of the binder principally occurs up to temperatures of approximately 500 to 600° C. Therefore it must be assumed that SSACS exposed to maximum temperatures less than 500° C. may contain partially carbonized binder. It is also expected that the intra-SSACS transport properties of SSACS prepared in these temperature ranges may be poor as a result of this partially carbonized binder. As such, even though such SSACS can exhibit high mechanical strengths, the utility of these SSACS in some applications may be limited. Heating of the SSACS to maximum temperatures between about 500° C. and less than about 900° C. eliminates the concerns associated with the partial carbonization of the binder and may have some economic advantages compared to heating to higher temperatures. SSACS prepared in this temperature range typically exhibit reduced mechanical strengths but improved electrical conductivities as compared to those SSACS prepared at lower temperatures. Heating of the SSACS to temperatures of about 900° C. to about 1000° C. results in SSACS having very good mechanical strengths and electrical conductivities significantly higher than those prepared using lower temperatures. Additionally, the binder-derived char contained in the SSACS heated to these higher temperatures appears to be very porous. Therefore SSACS prepared using these higher heating temperatures should have very good intraparticle transport properties. Based on these trends, it is expected that the use of carbonization/calcination temperatures of 1000° C. or higher will only further improve the strength and electrical conductivity properties of the resultant SSACS. Therefore the preferred maximum temperature to which the SSACS are heated is equal to or greater than about 900° C. Regardless of the maximum temperature selected, in all cases it is recommended that heating of the SSACS to any temperature greater than about 300° C., be performed in an atmosphere that is essentially inert with respect to the oxidation of carbon.

Heating of the SSACS to temperatures greater than or equal to about 300° C. can be accomplished using heat treatment equipment (furnaces) operated in an isothermal manner. Alternatively, the SSACS can be exposed to a progressively increasing range of temperatures using such equipment. This range of temperatures can progressively increased (i.e., ramped) with respect to time or distance/space. In all cases, such equipment should be provided with a means to essentially inert the heating chamber and thus prevent oxidation of the SSACS.

Residence times of the SSACS at the maximum temperature need not be excessive. Although not mandatory, it is usually preferred that the inner and outer volumes of the SSACS have uniform properties. Such uniformity is achieved by having a sufficient residence time at the maximum temperature such that all portions of the SSACS achieve this maximum temperature. Therefore minimum residence times are typically dependent on the SSACS size and configuration. As heat is transferred through the SSACS primarily by conduction, sufficient residence time at the maximum elevated temperature must be provided to insure that the interior and exterior volumes of the SSACS are at the same temperature.

It may be found that the size of the SSACS following exposure to the desired maximum temperature may be less than that exhibited prior to such exposure. Typically this "shrinkage" is at most a few percent. Such shrinkage can potentially be eliminated by reducing the binder and/or wetting solution volumes used in preparation of the SSACS. Alternatively, the size of the wet compacted SSACS can be adjusted for this shrinkage if SSACS of highly precise dimensions are desired. Such adjustments may be performed by modification of the dies, molds, extruders, or other devices used to compact and form the SSACS.

Following the heating of the SSACS to the desired maximum temperature, the SSACS should be cooled from the elevated temperature to about ambient temperatures under essentially inert conditions. If such cooling is conducted in other than the heating apparatus, provision should be made to inhibit exposure of the SSACS to air (oxygen) during any transfer between the two devices and/or whenever the temperature of the SSACS is greater than about 300° C. and more preferably ambient temperature. Once cooled, the SSACS may be optionally washed to remove any carbonization agent residues if so desired.

In a preferred embodiment of the invention 10 (weight) parts of a granular activated carbon is wet with a 10% aqueous solution of ammonium chloride. The amount of ammonium chloride solution is such that the carbon is visibly wet and a small amount of the solution is visible extraneous to the carbon granules. Next, six parts of wheat flour are added to the wet carbon. The combination is mixed such that the carbon granules are uniformly coated with the wet wheat flour and no uncombined solution is visually apparent. This resultant mixture is then placed into a forming die and compacted at a pressure of 300 psi. The resultant formed SSACS is removed from the die, placed into an oven, and subsequently dried at 100° C. Following drying, the SSACS is placed into a furnace having an inert, essentially oxygen free, atmosphere and heated at 1000° C. for 20 minutes. At the conclusion of the 20 minute time period, the SSACS is transferred from the furnace, under an essentially inert atmosphere, to a cooling chamber. After cooling to less than about 300° C. in an inert, essentially oxygen free, atmosphere, the SSACS is removed from the cooling chamber.

DESCRIPTION OF THE EXAMPLES

Example 1 demonstrates that the starch binders are not suitable for use in the present invention. Example 2 demonstrates the utility of the binder materials of the present invention for the production of self supporting activated carbon structures. Example 3 demonstrates that granular activated carbons having particle sizes between 4 and 325 mesh, and various distributions of particles sizes in that range have utility in the present invention. Example 4 demonstrates that various carbonization agents have utility in the present invention. Example 5 demonstrates the effect of utilizing selected amounts of carbonization agent in the practice of the present invention. Example 6 demonstrates the effect of utilizing selected amounts of binder in the practice of the present invention. Example 7 demonstrates typical effects of compaction force (i.e. pressure) on the resultant SSACS properties. Example 8 demonstrates typical relationships between the maximum temperature to which the SSACS is heated and resultant SSACS properties. Example 9 demonstrates that the activity of the granular activated carbon is not seriously degraded by the method of the present invention. Example 10 demonstrates large SSACS can be prepared by use of the present invention. Example 11 demonstrates honeycomb-like SSACS can be prepared by use of the present invention. For all the examples, unless otherwise noted, all solutions are aqueous and all percentage compositions are weight based.

EXAMPLES

Example 1

Unless otherwise noted, the following procedure was used to produce activated carbon SSACS.

PROCEDURE: Six portions of a granular activated carbon, each massing approximately 5.00 grams, are each mixed with approximately 6.1 ml of a wetting liquid or wetting solution. To each of these activated carbon-wetting liquid/solution mixtures was added approximately 4.00 grams of binder. The resulting mixtures were individually mixed until each exhibited a uniform composition. The activated carbon-binder-wetting solution mixtures typically are slightly tacky and exhibit a semi-plastic nature at this point. Following this mixing, each portion was placed individually into a cylindrical forming die and compacted, using a hydraulic press, at 500 pounds of force for 3 minutes. The cylindrical die was composed of three parts, a die body, and upper and lower rams. The die body was a hollow cylinder constructed of ultra-high molecular weight polyethylene. The die body had an inner diameter of approximately 1 and $\frac{1}{8}$ inches, an outer diameter of approximately 3 and $\frac{1}{8}$ inches, and a height of approximately 2 and $\frac{3}{4}$ inches. The lower and upper rams were constructed of steel and had outer diameters of approximately 1 and $\frac{1}{8}$ inches. The outer diameters of these rams were sized such that they provided a close fit to the die body inner walls when inserted into the die body. The height of the lower ram was approximately $\frac{3}{4}$ inch and that of the upper ram was approximately 3 and $\frac{1}{4}$ inches. After compaction and removal from the die, the resultant wet SSACS were then placed into an oven at approximately 100° C. to provide for overnight drying. Following drying, the dry SSACS were placed into lidded crucibles and calcined in a muffle furnace at approximately 950° C. under a substantially inert atmosphere for a furnace residence time period of approximately 20 minutes. Following calcination, the SSACS were transferred to and cooled in a cooling chamber to approximately ambient temperature under a substantially inert atmosphere. For both calcination and cooling, the substantially inert atmosphere was provided by passing a stream of nitrogen gas through the muffle furnace or cooling chamber. The use of lidded crucibles was to further inhibit any air (oxygen) exposure during heating, transfer, or cooling of the SSACS. Typically, the resultant SSACS were approximately 1 and $\frac{1}{8}$ inch in diameter and approximately 0.7 inches high.

Usually, following calcination and cooling, the mass, diameter, and height of each SSACS were measured for those SSACS that had adequate strength (i.e. mechanical integrity) for the associated minimal handling. SSACS densities were calculated using this data. Height and diameter data was usually not collected for SSACS that did not exhibit a well-formed cylindrical shape due to cracking, foaming, or swelling. Crush strength was also usually determined for those SSACS having a well-defined shape. Crush strength was determined by placing individual SSACS, centered, on the platform of a Spring Dial Compression Gauge (RIMAC Spring Tester, Model T4-0070, 0–1000 lbs range, Rinck-McIlwaine, Inc., 69 Armour Place, P.O. 98, Dumont, N.J. 07628) such that the principal axis of the cylindrical SSACS was co-axial with the applied force vector. The handle of the Spring Dial Compression Gauge was then steadily depressed until the SSACS fractured. The applied pressure required to fracture the SSACS was then read from the gauge "maximum-reading pointer". For a given sample set of six SSACS (i.e. those prepared in an identical manner), the collected data was averaged and the associated standard deviation determined.

Using the procedure described above, activated carbon SSACS were prepared using soluble starch, tapioca starch, or maltose-dextrin starch as a binder. The wetting liquid or wetting solution was either water, 10.0% $NH_4Cl$, 5.00% $(NH_4)_2HPO_4$, 10.0% $(NH_4)_2HPO_4$, or 15.0% $(NH_4)_2HPO_4$. The activated carbon was a granular material. This granular activated carbon had been characterized as having a nominal mesh size of 12×20 mesh (meaning the particle size of this carbon was less than 12 mesh and greater than 20 mesh, both mesh sizes as per the U.S. Sieve Series), an Apparent Density (Calgon Carbon Test Number 7, Calgon Carbon Corp., Pittsburgh, Pa.) of 0.507 g/cc, Mean Particle Diameter (Calgon Carbon Test Number 9, Calgon Carbon Corp., Pittsburgh, Pa.) of 1.29 mm, and an Iodine Number of 1196 mg/g (Calgon Carbon Test Number 4, Calgon Carbon Corp., Pittsburgh, Pa.). The properties of the resultant SSACS are given in Table 1.

As shown in Table 1, none of the listed combinations of binder and wetting liquid or wetting solution resulted in SSACS which maintained their intended and as-formed well-defined cylindrical appearance. For all three binders, preparations using water as the wetting liquid resulted in SSACS so weak (lacking mechanical integrity) as to essentially fall apart with minimal handling. Those prepared using the three different binders and 10.0% $NH_4Cl$ showed somewhat better mechanical strength and mass data could be collected for some combinations of binder and wetting liquid. For these SSACS, the average mass values and associated standard deviations are shown in Table 1. But, it should be noted that all of these SSACS exhibited distorted physical shapes. Some swelled during drying and/or calcination such that the original cylindrical shape of the SSACS was distorted. Similarly, others foamed to such a extent that the cylindrical shape was completely distorted and the resultant agglomerated material appeared to be somewhat spherical in shape. A few of these preparations, some of which were prepared as duplicates of other sample sets, were judged so weak after oven drying as to preclude subsequent calcination. Therefore, as evidenced by the data presented in Table 1, starches as taught by the prior art, even in combination with selected carbonization agents, do not provide acceptable or adequate post-calcination binding of granular activated carbon.

TABLE 1

PROPERTIES OF SSACS PREPARED USING SELECTED STARCHES AS BINDERS

| sample set reference number | binder | wetting liquid or solution | calcined SSACS appearance | average calcined SSACS mass (g) | average calcined SSACS density (g/cc) | average calcined crush strength (lbs) |
|---|---|---|---|---|---|---|
| 3285-23 | soluble starch | H2O | disintegrated | — | — | — |
| 3285-22 | " | 10.0% NH4Cl | foamed | 5.94 +/− 0.03 | — | — |
| 3285-34 | " | 10.0% NH4Cl | too weak to calcine | — | — | — |
| 3285-66 | " | 5.00% (NH4)2HPO4 | swelled | 5.82 +/− 0.02 | — | — |
| 3285-44 | " | 10.0% (NH4)2HPO4 | severely swelled | 5.95 +/− 0.02 | — | — |
| 3285-56 | " | 10.0% (NH4)2HPO4 | too soft to calcine | — | — | — |
| 3285-62 | " | 15.0% (NH4)2HPO4 | too soft to calcine | — | — | — |
| 3285-29 | tapioca starch | H2O | disintegrated | — | — | — |
| 3285-28 | " | 10.0% NH4Cl | swelled | 5.34 +/− 0.32 | — | — |
| 3285-52 | " | 10.0% NH4Cl | too weak to calcine | — | — | — |
| 3285-53 | " | 10.0% NH4Cl | too weak to calcine | — | — | — |
| 3285-89 | " | 5.00% (NH4)2HPO4 | slightly swelled | 5.69 +/− 0.04 | — | — |
| 3285-45 | " | 10.0% (NH4)2HPO4 | swelled | 5.86 +/− 0.02 | — | — |
| 3287-10 | " | 15.0% (NH4)2HPO4 | swelled | 6.03 +/− 0.02 | — | — |
| 3285-13 | maltose-dextrin starch | H2O | disintegrated | — | — | — |
| 3285-12 | maltose-dextrin starch | 10.0% NH4Cl | foamed severely | 5.95 +/− 0.12 | — | — |
| 3287-8 | maltose-dextrin starch | 5.00% (NH4)2HPO4 | swelled | 5.77 +/− 0.02 | — | — |
| 3285-43 | maltose-dextrin starch | 10.0% (NH4)2HPO4 | severely swelled | 5.90 +/− 0.03 | — | — |

TABLE 1-continued

PROPERTIES OF SSACS PREPARED USING SELECTED STARCHES AS BINDERS

| sample set reference number | binder | wetting liquid or solution | calcined SSACS appearance | average calcined SSACS mass (g) | average calcined SSACS density (g/cc) | average calcined crush strength (lbs) |
|---|---|---|---|---|---|---|
| 3287-6 | maltose-dextrin starch | 15.0% (NH4)2HPO4 | swelled, cracked | 6.05 +/- 0.05 | — | — |

Example 2

SSACS were prepared and characterized using the granular activated carbon, wetting liquid or solutions, and procedures as given in Example 1. The preparation of these SSACS differed from those of Example 1 with respect to the selection of binders. The binders used to prepare the SSACS of this example were various examples of materials. These examples of materials selected for use as binders were wheat flour, oat flour, spelt flour, corn flour (light roast), rice flour, barley flour, buck wheat flour, dark rye flour, and potato flour. The properties of the sets of SSACS prepared with these binders, and associated standard deviations, are given in Table 2.

As shown in Table 2, wheat flour (of the type commonly used for baking purposes) produced a SSACS of good appearance (well-defined edges, a uniform surface, no visible significant cracks, little if any spalling of activated carbon granules from the SSACS surface) and a 40 lbs crush strength when water was used as the wetting liquid. When 10.0% ammonium chloride was substituted for water in the formulation, the SSACS mass, density, and crush strength all increased markedly as compared to those SSACS prepared using water. Similar increases were observed when diammonium hydrogen phosphate solutions were used as the wetting solutions. It can also be noted that the SSACS mass, density, and crush strength all increased with the concentration of diammonium hydrogen phosphate used as the wetting solution. Spelt flour (spelt is a specific type of hard grain wheat), as would be expected, produced SSACS having properties similar to those produced using ordinary wheat flour.

Table 2 also shows that the listed properties of the SSACS prepared using oat flour and dark rye flour as binders generally exhibited the same trends with respect to the wetting liquid composition as did those prepared from wheat flour. Specifically, these trends differed from those observed using wheat flour with respect to higher SSACS masses and lower SSACS densities and crush strengths.

All of the other binders (corn flour, rice flour, barley flour, buck wheat flour, and potato flour) used in this example exhibited at least some swelling with at least one of the selected wetting liquid or wetting solutions. These results do, however, demonstrate that judicious selection of the wetting liquid or wetting solution composition can prevent, for these binders, the swelling of the SSACS with calcination. Examination of Table 2 will also show, that generally, diammonium hydrogen phosphate proved to be more effective at reducing SSACS swelling than did ammonium chloride. It is also apparent that SSACS crush strength increases with the concentration of carbonization agent in the wetting liquid. Furthermore, it is clearly evident that the use of a carbonization agent containing wetting liquid significantly increases the resultant SSACS mass, density, and crush strength. This increase demonstrates that the use of a carbonization agent in the wetting liquid results in a greater carbon char yield following calcination. Also note that those SSACS prepared using 10% diammonium hydrogen phosphate containing wetting solution typically exhibited higher average calcined SSACS crush strengths than do those prepared using 10% ammonium chloride containing wetting solution. This is even more notable as the "average calcined SSACS mass" of the sample sets prepared using these two different carbonization agents are not that much different. These results would suggest that the use of the diammonium hydrogen phosphate carbonization agent in the wetting liquid may result in a stronger starchy-material derived char, or stronger bonding of this char to the granular activated carbon, than that obtained using ammonium chloride as the carbonization agent in the wetting solution.

Therefore, the data exhibited in Table 2 demonstrates that the binder materials of the present invention can be used to produce SSACS, unlike the starches taught by the prior art.

TABLE 2

PROPERTIES OF SSACS PREPARED USING GRAIN AND TUBER FLOURS AS BINDERS

| sample set reference number | binder | wetting liquid or solution | calcined SSACS appearance | average calcined SSACS mass (g) | average calcined SSACS density (g/cc) | average calcined SSACS crush strength (lbs) |
|---|---|---|---|---|---|---|
| 3285-3 | wheat flour | H2O | good | 5.53 +/- 0.02 | 0.526 +/- 0.003 | 40 +/- 2 |
| 3285-2 | wheat flour | 10.0% NH4Cl | very good | 5.97 +/- 0.03 | 0.556 +/- 0.005 | 178 +/- 3 |
| 3285-85 | wheat flour | 5.00% (NH4)2HPO4 | very good | 5.86 +/- 0.02 | 0.574 +/- 0.004 | 206 +/- 9 |
| 3285-90 | wheat flour | 10.0% (NH4)2HPO4 | very good | 5.94 +/- 0.03 | 0.580 +/- 0.006 | 263 +/- 12 |

TABLE 2-continued

PROPERTIES OF SSACS PREPARED
USING GRAIN AND TUBER FLOURS AS BINDERS

| sample set reference number | binder | wetting liquid or solution | calcined SSACS appearance | average calcined SSACS mass (g) | average calcined SSACS density (g/cc) | average calcined SSACS crush strength (lbs) |
|---|---|---|---|---|---|---|
| 3285-94 | wheat flour | 15.0% (NH4)2HPO4 | very good | 6.05 +/- 0.04 | 0.594 +/- 0.006 | 355 +/- 9 |
| 3285-5 | oat flour | H2O | good | 5.59 +/- 0.02 | 0.508 +/- 0.007 | 26 +/- 3 |
| 3285-4 | oat flour | 10.0% NH4Cl | good | 6.14 +/- 0.02 | 0.532 +/- 0.003 | 80 +/- 6 |
| 3285-84 | oat flour | 5.00% (NH4)2HPO4 | good | 6.17 +/- 0.01 | 0.552 +/- 0.004 | 102 +/- 4 |
| 3285-91 | oat flour | 10.0% (NH4)2HPO4 | very good | 6.29 +/- 0.04 | 0.552 +/- 0.004 | 137 +/- 3 |
| 3285-95 | oat flour | 15.0% (NH4)2HPO4 | good | 6.39 +/- 0.04 | 0.556 +/- 0.005 | 157 +/- 9 |
| 3285-7 | corn flour | H2O | swelled, cracked | — | — | — |
| 3285-6 | corn flour | 10.0% NH4Cl | swelled | 6.10 +/- 0.02 | — | — |
|  | corn flour | 5.00% (NH4)2HPO4 | very good | 6.10 +/- 0.01 | 0.500 +/- 0.005 | 87 +/- 5 |
| 3285-39 | corn flour | 10.0% (NH4)2HPO4 | good | 6.16 +/- 0.01 | 0.511 +/- 0.008 | 97 +/- 7 |
| 3287-2 | corn flour | 15.0% (NH4)2HPO4 | very slightly swelled | 6.37 +/- 0.03 | 0.514 +/- 0.010 | 93 +/- 14 |
| 3285-9 | rice flour | H2O | very slightly swelled | 5.58 +/- 0.03 | — | — |
| 3285-8 | rice flour | 10.0% NH4Cl | swelled | 6.15 +/- 0.00 | — | — |
| 3285-63 | rice flour | 5.00% (NH4)2HPO4 | very good | 6.08 +/- 0.01 | 0.532 +/- 0.006 | 181 +/- 10 |
| 3285-40 | rice flour | 10.0% (NH4)2HPO4 | good | 6.23 +/- 0.02 | 0.540 +/- 0.004 | 169 +/- 3 |
| 3285-59 | rice flour | 15.0% (NH4)2HPO4 | very good | 6.40 +/- 0.02 | 0.554 +/- 0.007 | 185 +/- 9 |
| 3285-25 | barley flour | H2O | good | 5.64 +/- 0.01 | 0.502 +/- 0.001 | 23 +/- 1 |
| 3285-24 | barley flour | 10.0% NH4Cl | very slightly swelled | 6.01 +/- 0.03 | — | — |
| 3285-65 | barley flour | 5.00% (NH4)2HPO4 | very good | 6.05 +/- 0.03 | 0.535 +/- 0.006 | 111 +/- 6 |
| 3285-42 | barley flour | 10.0% (NH4)2HPO4 | very good | 6.18 +/- 0.03 | 0.540 +/- 0.007 | 145 +/- 6 |
| 3285-61 | barley flour | 15.0% (NH4)2HPO4 | very slightly swelled | 6.32 +/- 0.04 | 0.530 +/- 0.007 | 155 +/- 14 |
| 3285-15 | buck wheat flour | H2O | swelled, soft | 5.49 +/- 0.02 | — | — |
| 3285-14 | buck wheat flour | 10.0% NH4Cl | swelled | 6.11 +/- 0.02 | — | — |
| 3285-64 | buck wheat flour | 5.00% (NH4)2HPO4 | very good | 5.98 +/- 0.03 | 0.517 +/- 0.009 | 174 +/- 25 |
| 3285-41 | buck wheat flour | 10.0% (NH4)2HPO4 | good | 6.09 +/- 0.03 | 0.516 +/- 0.007 | 195 +/- 9 |
| 3285-60 | buck wheat flour | 15.0% (NH4)2HPO4 | slightly swelled | 6.24 +/- 0.02 | — | — |
| 3285-21 | dark rye flour | H2O | good | 5.58 +/- 0.02 | 0.489 +/- 0.003 | 14 +/- 2 |
| 3285-20 | dark rye flour | 10.0% NH4Cl | good | 6.24 +/- 0.01 | 0.522 +/- 0.005 | 49 +/- 5 |
| 3285-87 | dark rye flour | 5.00% (NH4)2HPO4 | very good | 6.18 +/- 0.01 | 0.520 +/- 0.005 | 48 +/- 1 |
| 3285-92 | dark rye flour | 10.0% (NH4)2HPO4 | good | 6.38 +/- 0.03 | 0.542 +/- 0.004 | 87 +/- 5 |
| 3287-3 | dark rye flour | 15.0% (NH4)2HPO4 | very good | 6.51 +/- 0.03 | 0.550 +/- 0.003 | 115 +/- 3 |
| 3285-27 | spelt flour | H2O | good | 5.76 +/- 0.03 | 0.532 +/- 0.006 | 74 +/- 6 |
| 3285-26 | spelt flour | 10.0% NH4Cl | good | 6.05 +/- 0.01 | 0.548 +/- 0.007 | 94 +/- 4 |
| 3285-88 | spelt flour | 5.00% (NH4)2HPO4 | very good | 6.00 +/- 0.03 | 0.561 +/- 0.008 | 160 +/- 4 |
| 3285-93 | spelt flour | 10.0% (NH4)2HPO4 | very good | 6.13 +/- 0.03 | 0.586 +/- 0.007 | 267 +/- 11 |
| 3287-4 | spelt flour | 15.0% (NH4)2HPO4 | very good | 6.32 +/- 0.02 | 0.591 +/- 0.004 | 334 +/- 7 |
| 3285-11 | potato flour | H2O | swelled, cracked | 5.74 +/- 0.02 | — | — |
| 3285-10 | potato flour | 10.0% NH4Cl | very good | 6.22 +/- 0.02 | 0.542 +/- 0.005 | 173 +/- 10 |
| 3287-7 | potato flour | 5.00% (NH4)2HPO4 | very good | 6.07 +/- 0.02 | 0.527 +/- 0.010 | 140 +/- 10 |
| 3287-9 | potato flour | 10.0% (NH4)2HPO4 | very good | 6.32 +/- 0.03 | 0.545 +/- 0.004 | 204 +/- 5 |
| 3287-5 | potato flour | 15.0% (NH4)2HPO4 | very good | 6.42 +/- 0.03 | 0.549 +/- 0.003 | 239 +/- 11 |

Example 3

A nominal 4×6 mesh granular activated carbon having a Mean Particle Diameter of 3.18 mm, an Iodine Number of 958 mg/g, and an Apparent Density of 0.518 g/cc was crushed and/or screened to produce granular activated carbons of 4×6, 6×10, 10×20, 20×80, and 80×325 mesh size. Also, equal mass portions of each of these screen size fractions were blended to produce a 4×325 mesh size activated carbon of known Mean Particle Diameter. Six portions of the granular activated carbons having each of these screen size fractions were used to produce SSACS by use of the procedure given in Example 1 with three exceptions. The first exception was that the compaction pressure was 300 lbs. The second exception was that the volume of wetting solution used to form the SSACS was approximately 4.5 ml for the 4×6 mesh carbon portion, 4.7 ml for the 6×10 mesh size carbon portion, 4.9 ml for the 10×20 mesh size portion, 5.1 ml for the 20×80 mesh size portion, 5.5 ml for the 80×325 mesh size portion, and 5.1 ml for the 4×325 mesh size portion. And the third exception was that approximately 3.00 grams of binder was used to prepare each SSACS. The resultant SSACS were also characterized using the methods described in Example 1.

Specifically, water or a 10.0% ammonium chloride solution was used as the wetting liquid or solution for each mesh size portion of granular activated carbon. The binder was wheat flour.

binder char yield and what could possibly be a stronger char. The higher binder char yield is evidenced by the difference in SSACS mass between those sample sets prepared with water only and those sample sets prepared using aqueous ammonium chloride solution as the wetting solution. The possibly higher binder char strength is indicated by the relatively constant crush strength exhibited by the sample sets prepared using water as the wetting liquid versus the carbon mesh size/Mean Particle Diameter dependent crush strength exhibited by those SSACS prepared using a carbonization agent (ammonium chloride) in the wetting solution. It should be also noted that the crush strengths of the SSACS prepared using the 4×325 mesh size activated carbon are higher than that which would be expected from a comparison of the Mean Particle Diameter of the subject activated carbon to those Mean Particle Diameters and Crush Strengths of the narrow mesh size activated carbons. Such a result is thought to be related to activated carbon packing effects (as exhibited by the significant Apparent Density difference between the 4×325 mesh materials and the other size fractions) and to the magnitude of the cumulative outer surface area of the individual activated carbon granules.

TABLE 3

PROPERTIES OF SSACS PREPARED USING SELECTED MESH SIZES OF GRANULAR ACTIVATED CARBON

| sample set reference number | granular carbon mesh size | granular carbon apparent density (g/cc) | granular carbon mean particle diameter (mm) | wetting liquid or solution | calcined SSACS appearance | average calcined SSACS mass (g) | average calcined SSACS density (g/cc) | average calcined SSACS crush strength (lbs) |
|---|---|---|---|---|---|---|---|---|
| 3285-74 | 4 × 6 | 0.51 | 3.71 | H2O | mediocre | 5.67 +/- 0.00 | 0.535 +/- 0.005 | — |
| 3285-67 | " | " | " | 10% NH4Cl | mediocre | 6.16 +/- 0.03 | 0.547 +/- 0.010 | — |
| 3285-75 | 6 × 10 | 0.505 | 2.88 | H2O | mediocre | 5.60 +/- 0.02 | 0.510 +/- 0.008 | — |
| 3285-68 | " | " | " | 10% NH4Cl | mediocre | 6.17 +/- 0.01 | 0.538 +/- 0.009 | — |
| 3285-76 | 10 × 20 | 0.509 | 1.22 | H2O | good | 5.67 +/- 0.01 | 0.522 +/- 0.003 | 50 +/- 3 |
| 3285-69 | " | " | " | 10% NH4Cl | good | 6.21 +/- 0.02 | 0.569 +/- 0.007 | 140 +/- 2 |
| 3285-77 | 20 × 80 | 0.519 | 0.56 | H2O | excellent | 5.67 +/- 0.00 | 0.514 +//- 0.008 | 103 +/- 8 |
| 3285-72 | " | " | " | 10% NH4Cl | excellent | 6.20 +/- 0.01 | 0.593 +/- 0.005 | 293 +/- 13 |
| 3285-78 | 80 × 325 | 0.474 | 0.22 | H2O | excellent | 5.68 +/- 0.02 | 0.500 +/- 0.003 | 63 +/- 4 |
| 3285-73 | " | " | " | 10% NH4Cl | excellent | 6.19 +/- 0.01 | 0.580 +/- 0.004 | 442 +/- 37 |
| 3287-16 | 4 × 325 | 0.616 | 1.72 | H2O | good | 5.54 +/- 0.01 | 0.535 +/- 0.011 | 73 +/- 9 |
| 3287-11 | 4 × 325 | " | " | 10% NH4Cl | good | 6.10 +/- 0.03 | 0.604 +/- 0.008 | 281 +/- 45 |

Table 3 shows the average properties and the associated standard deviations of the sample sets of SSACS prepared in this manner. As shown in this Table, the appearance of the SSACS prepared using the 4×6 and 6×10 mesh size carbons were judged to be mediocre. These SSACS exhibited a very rough surface texture and didn't appear to have great deal of mechanical integrity. The rough surface texture of these SSACS would be somewhat expected as a result of the relatively large Mean Particle Diameters of the larger mesh carbons. The crush strength of the SSACS prepared from the 4×6 and 6×10 mesh size carbons could not be reliably measured as it could not be clearly determined as to when structural failure occurred with increasing applied force. But, as shown in this example, it is possible to make activated carbon SSACS using these larger mesh size/Mean Particle Diameter activated carbons. On the other hand, smaller activated carbon mesh sizes/Mean Particle Diameters produced SSACS of good to excellent appearance. Also note that as the Mean Particle Diameter decreases, the crush strength of the associated SSACS significantly increases.

As with the previous examples, the use of a carbonization agent, in this case ammonium chloride, results in a higher

Example 4

Example 4: SSACS were prepared using a 12×40 mesh granular activated carbon having an Apparent Density of 0.394 g/cc, a Mean Particle Diameter of 1.11 mm, and an Iodine Number of 1312 mg/g. The wetting liquid or solutions used in the preparation of these SSACS were H2O and 10.0% solutions of selected carbonization agents. The carbonization agents selected for use were ammonium chloride, ammonium iodide, ammonium bromide, ammonium sulfate, phosphoric acid, ammonium dihydrogen phosphate, diammonium hydrogen phosphate, and zinc chloride. The procedure used to prepare these SSACS was that given in Example 1 except for the following modifications. First, the amount of wetting liquid or solution used to prepare each SSACS was approximately 6.7 grams. Second, the carbon-binder-wetting liquid/solution mixtures were compacted using 300 lbs of force rather than 500 lbs. Third, the binder mass for each SSACS was approximately 3.00 grams. And fourth, a Carver Model "C" Lab Press (Fred S. Carver Inc., P.O. Box 428, Menomonee Falls, Wis. 53051-0428) fitted with a 0 to 500 lbs load gauge was substituted for the Spring Dial Compression Gauge for the determination of crush strength. Wheat flour was used as the binder.

Selected average properties, and associated standard deviations, of the sets of SSACS prepared in this manner are given in Table 4. Examination of this data shows that the use of an 10% zinc chloride solution as a wetting solution resulted in SSACS having densities equivalent to, and crush strengths much lower than those obtained using H2O as the wetting liquid. Therefore it is obvious that zinc chloride is not suitable for use as a carbonization agent in the present invention. The wetting solutions that utilized the other selected carbonization agents resulted in activated carbon SSACS having densities and crush strengths superior to those obtained by use of only water as a wetting liquid. Therefore the benefits of the use of the selected carbonization agent as an additive to the wetting liquid, to form a wetting solution, is illustrated. It may also be noted that the use of the various phosphate-based carbonization agents as solutes in the wetting solution resulted in SSACS having the highest crush strengths observed in this example. This result indicates that the "cross-linking" action of such agents may be responsible for this observed further improvement in SSACS strength.

SSACS, wheat flour was used as the binder. Seven sets of SSACS were prepared. The preparation of these sets differed with respect to the type of wetting liquid/solution used. The seven wetting liquid/solutions used are listed in Table 5.

The average properties of the sets of SSACS prepared in this manner are also given in Table 5. As shown in this Table, the "average calcined SSACS mass" increased with the concentration of carbonization agent (diammonium hydrogen phosphate) in the wetting solution. The "average calcined SSACS density" and crush strength also increased with the wetting solution diammonium hydrogen phosphate concentration up to a value of 20.0%. At a 25.0% diammonium hydrogen phosphate wetting solution concentration the "average calcined SSACS density" showed a very slight decrease and the "average calcined SSACS crush strength" greatly decreased from those values observed using a 20.0% diammonium hydrogen phosphate wetting solution concentration. These results demonstrates that it can be expected that some amount of carbonization agent results in a maximum with respect to the improvement of the listed properties of the resultant SSACS.

TABLE 4

PROPERTIES OF SSACS PREPARED USING SELECTED CARBONIZATION AGENTS

| sample set number | wetting liquid or solution | average calcined SSACS mass (g) | average calcined SSACS density (g/cc) | average calcined SSACS crush strength (lbs) |
| --- | --- | --- | --- | --- |
| 3165-96 | H2O | 5.60 +/− 0.01 | 0.441 +/− 0.004 | 62 +/− 5 |
| 3256-03 | 10.0% ZnCl2 | 5.88 +/− 0.02 | 0.441 +/− 0.003 | 25* |
| 3165-95 | 10.0% NH4Cl | 5.92 +/− 0.01 | 0.461 +/− 0.005 | 140 +/− 5 |
| 3256-05/6 | 10.0% NH4Br | 5.91 +/− 0.02 | 0.447 +/− 0.005 | 101 +/− 8 |
| 3287-22 | 10.0% NH4I | 5.87 +/− 0.00 | 0.440 +/− 0.006 | 130 +/− 8 |
| 3287-17 | 10.0% (NH4)2SO4 | 5.84 +/− 0.01 | 0.433 +/− 0.003 | 106 +/− 8 |
| 3256-04/5 | 10.0% H3PO4 | 5.98 +/− 0.01 | 0.453 +/− 0.007 | 215 +/− 11 |
| 3256-03/4 | 10.0% NH4H2PO4 | 6.06 +/− 0.02 | 0.459 +/− 0.005 | 213 +/− 14 |
| 3256-02 | 10.0% (NH4)2HPO4 | 6.04 +/− 0.01 | 0.467 +/− 0.006 | 275 +/− 14 |

*one data point

Example 5

Sets of SSACS were prepared and characterized using the procedures described in Example 1. For all these sets of

TABLE 5

PROPERTIES OF SSACS PREPARED USING SELECTED AMOUNTS OF A GIVEN CARBONIZATION AGENT

| sample set reference number | wetting liquid or solution | average calcined SSACS mass (g) | average calcined SSACS density (g/cc) | average calcined SSACS crush strength (lbs) |
| --- | --- | --- | --- | --- |
| 3285-03 | H2O | 5.53 +/− 0.02 | 0.526 +/− 0.003 | 40 +/− 2 |
| 3287-19 | 2.50% (NH4)2HPO4 | 5.76 +/− 0.02 | 0.566 +/− 0.006 | 141 +/− 4 |
| 3285-85 | 5.00% (NH4)2HPO4 | 5.86 +/− 0.02 | 0.574 +/− 0.004 | 206 +/− 9 |

TABLE 5-continued

PROPERTIES OF SSACS PREPARED USING SELECTED AMOUNTS OF A GIVEN CARBONIZATION AGENT

| sample set reference number | wetting liquid or solution | average calcined SSACS mass (g) | average calcined SSACS density (g/cc) | average calcined SSACS crush strength (lbs) |
|---|---|---|---|---|
| 3285-90 | 10.0% (NH4)2HPO4 | 5.94 +/− 0.03 | 0.580 +/− 0.006 | 263 +/− 12 |
| 3285-94 | 15.0% (NH4)2HPO4 | 6.05 +/− 0.04 | 0.594 +/− 0.006 | 355 +/− 9 |
| 3287-18 | 20.0% (NH4)2HPO4 | 6.33 +/− 0.03 | 0.589 +/− 0.005 | 368 +/− 15 |
| 3287-20 | 25.0% (NH4)2HPO4 | 6.43 +/− 0.03 | 0.582 +/− 0.005 | 303 +/− 13 |

Example 6

SSACS were prepared using a 12×40 mesh granular activated carbon having an Apparent Density of 0.411 g/cc, a Mean Particle Diameter of 1.08 mm, and an Iodine Number of 1286 mg/g. The wetting solution used in the preparation of these SSACS was a 10.0% solution of diammonium hydrogen phosphate. The binder was wheat flour. The procedure used to prepare these SSACS was that given in Example 1 except for the following modifications. First, the amount of wetting solution used to prepare each SSACS was as given in Table 6. As shown in this Table, the average mass of wetting solution increased with the increase in the mass of the binder. This increase in wetting solution was necessary to insure the binder-carbon formed a semi-plastic mass when combined and mixed. Second, the carbon-binder-wetting solution mixtures were compacted using 300 lbs of force rather than 500 lbs. Third, the binder mass for each SSACS was as given in Table 6. And fourth, a Carver Model "C" Lab Press (Fred S. Carver Inc., P.O. Box 428, Menomonee Falls, Wis. 53051-0428) fitted with a 0 to 500 lbs load gauge was substituted for the Spring Dial Compression Gauge for the determination of crush strength.

The resistivity of the resultant cylindrical activated carbon SSACS were determined in the following manner. An aluminum plate was placed against one face and another aluminum plate against the opposite faces of a cylindrical SSACS. The aluminum plates measured approximately 1 and ½ inches by 2 and ½ inches and were ⅛ inch thick. The orientation of this placement was such that the planes determined by the aluminum plates were perpendicular to the principle axis of the cylindrical SSACS and that each aluminum plate completely covered its respective SSACS face. The sides of the aluminum plates opposite those contacting the carbon SSACS were insulated with a non-conductive plastic. Provisions were made on the edges of each aluminum plate for the attachment of electrical leads. These electrical leads were connected to a Keithley Model 580 Micro-ohmmeter (Keithley Instruments, Inc., Cleveland, Ohio) in a manner to provide resistance measurements by use of the "4-Wire Method". Once the activated carbon SSACS and aluminum plates were orientated as described, a force of 50 pounds was applied to the assembly such that the direction of the force was co-axial to that of the principle axis of the cylindrical SSACS. During the application of this force, the resistance of the assembly was measured using a Keithley Model 580 Micro-ohmmeter. As the resistance of the aluminum plates and associated electrical leads were negligible due to the use of the "4-Wire method", the measured resistance was taken as that of the activated carbon SSACS. As it would be expected that the activated carbon SSACS would be electrically isotropic, the resistivity of the carbon SSACS would then be the product of the SSACS resistance times the cylindrical SSACS cross sectional area divided by the SSACS height. By use of this relationship and the measured SSACS resistance, diameter, and height, the resistivity of the bonded material comprising each SSACS was determined. For those SSACS prepared in an equivalent manner, in this case six in number, the resultant individual resistivities determined by this method were averaged and the associated standard deviation of this average determined.

The resistivity of the granular activated carbon used in the preparation of these SSACS was determined by placing approximately 5.0 g of the carbon described above into a cylindrical cavity formed into a piece of non-electrically conductive plastic. The bottom of this cylindrical cavity was filled with an solid aluminum cylinder. After insertion of the carbon sample into the cylindrical cavity, another solid aluminum cylinder was inserted into the cylindrical cavity such that the carbon was positioned between the inner faces of the two aluminum cylinders. The aluminum cylinders had diameters of 1.125 inches, which closely matched the diameter of the cylindrical cavity, and smooth end faces machined perpendicular to the principle axis of each cylinder. Provision was made such that electrical leads could be attached to the outer end of each aluminum cylinder. These electrical leads connected the cylinders to a Keithley Model 580 Micro-ohmmeter (Keithley Instruments, Inc., Cleveland, Ohio) in a manner to provide resistance measurements by use of the "4-Wire Method". A force of 50 pounds was then applied to outer face of the aluminum cylinders. The vector of this force was parallel to that of the principle axis the aluminum cylinders. The application of this force resulted in the compaction of the carbon between the inner faces of the aluminum cylinders. During the application of this force, the resistance across the compacted carbon sample was measured. The resistivity of the compacted carbon sample was calculated using this resistance value, the aluminum cylinder diameter, and the distance between the inner faces of the aluminum cylinders while compacting the carbon sample. The distance between the inner faces of the aluminum cylinders while compacting the carbon sample was calculated as the difference in the distance between the outer faces of the aluminum cylinders with and without the presence of the compacted carbon sample. As such, the resistivity of the carbon sample would then be the product of the measured resistance times the cross sectional area of the aluminum cylinder inner face divided by the distance between the inner faces of the aluminum cylinders during compaction. The resistivity of the granular activated carbon used for the preparation of the SSACS considered in this example was 1.70 ohm-cm.

Selected average properties, and associated standard deviations, of the SSACS prepared in this manner are given in Table 6. As shown in this Table, the "average calcined SSACS mass", density, and crush strength all increase, although not necessarily proportionally, with the increase in binder mass. The "average calcined SSACS resistivity" decreases up to 3.00 g binder and then remains relatively constant (if the standard deviations of the "average calcined SSACS resistivity" data are considered). Therefore it is evident that the use of increased amounts of binder results in increased SSACS densities and crush strengths. It is also evident that a minimum amount of binder is required obtain the minimum resistivity of the SSACS material when prepared using a given procedure. The use of binder levels greater than this minimum amount do not result in further lowering of the resistivity. It is also apparent that the resistivities of the SSACS are lower than that of the unbonded granular activated carbon. Therefore, the electrical conductivity of the SSACS can be superior to that of a unbonded packed bed of the granular activated carbon.

The average properties of the sets of SSACS prepared and characterized in the manner described above are given in Table 7. As shown in this Table, the magnitude of the compaction force has little if any impact of the resultant "average calcined SSACS mass". It therefore appears the compaction force does not significantly impact the various changes/reactions experienced by the binder during carbonization and/or calcination. It is observed, however, that compaction force may have some impact on the other SSACS properties shown in this Table. For example, it is observed that the "average calcined SSACS density" generally increases with compaction pressure. This would suggest that the increased compaction force may be increasingly forcing the semi-plastic binder into voids in and around the granular activated carbon. The average calcined SSACS resistivity, within the limits of the associated standard deviations, shows little change with increasing compaction force until those forces reach 800 and 1000 pounds. This result could suggest crushing of the granular activated carbon may be occurring at these higher forces. It should also be noted that all the resistivities measured shown for these SSACS are considerably less than that of the granular activated carbon from which the SSACS were prepared. The "average calcined SSACS crush strength" also increases with compaction pressure. This again could suggest that filling of the previously mentioned voids may be occurring. It is also possible that such void filling may increase the degree of binder-granular activated carbon contact, and thus

TABLE 6

PROPERTIES OF SSACS PREPARED USING SELECTED AMOUNTS OF WHEAT FLOUR AS A BINDER

| sample set number | average mass binder (g) | average mass wetting solution (g) | average calcined SSACS mass (g) | average calcined SSACS density (g,cc) | average calcined SSACS resistivity (mohm-cm) | average calcined SSACS crush strength (lbs) |
|---|---|---|---|---|---|---|
| 3256-62 | 1.00 +/− 0.01 | 6.37 +/− 0.01 | 5.27 +/− 0.03 | 0.405 +/− 0.003 | — | 31 +/− 3* |
| 3256-63 | 2.00 +/− 0.01 | 6.75 +/− 0.02 | 5.73 +/− 0.02 | 0.445 +/− 0.006 | 351 +/− 10 | 120 +/− 13* |
| 3256-64 | 3.00 +/− 0.01 | 6.92 +/− 0.02 | 6.12 +/− 0.01 | 0.470 +/− 0.004 | 266 +/− 20 | 226 +/− 9 |
| 3256-65 | 4.01 +/− 0.00 | 7.46 +/− 0.03 | 6.50 +/− 0.01 | 0.491 +/− 0.007 | 284 +/− 14 | 235 +/− 13 |
| 3256-66 | 5.01 +/− 0.00 | 8.0I +/− 0.01 | 6.83 +/− 0.02 | 0.502 +/− 0.005 | 288 +/− 2 | 313 +/− 15 |

*average of five samples

Example 7

SSACS were prepared using a 12×40 mesh granular activated carbon having an Apparent Density of 0.394 g/cc, a Mean Particle Diameter of 1.11 mm, and an Iodine Number of 1312 mg/g. The wetting solution used in the preparation of these SSACS was a 10.0% solution of diammonium hydrogen phosphate. The binder was wheat flour. The procedure used to prepare these SSACS was that given in Example 1 except for the following modifications. First, the mass of wetting solution used to prepare each SSACS was approximately 7.2 g. Second, the carbon-binder-wetting solution mixtures were compacted using the forces listed in Table 7 rather than 500 lbs, Third, the binder mass for each SSACS was approximately 3.00 g. And fourth, a Carver Model "C" Lab Press (Fred S. Carver Inc., P.O. Box 428, Menomonee Falls, Wis. 53051-0428) fitted with a 0 to 500 lbs load gauge was substituted for the Spring Dial Compression Gauge for the determination of crush strength.

The resistivity of the granular activated carbon described above was 1.49 ohm-cm as determined using the method given in Example 6. Also, the average calcined SSACS resistivity was determined using the method given in Example 6.

lead to a stronger bond. Finally, the "calculated calcined SSACS activated carbon density" represents the density of the granular activated carbon in the SSACS (i.e. the density of the SSACS if no binder related char was present). It should be noted that the "calculated calcined SSACS activated carbon density" was calculated by multiplying the average calcined SSACS density by the mass of activated carbon present (5.00 g) and dividing the result by the "average calcined SSACS mass". Obviously, the validity of this calculation is based on the assumption that mechanical losses of granular activated carbon during reparation of the SSACS were insignificant. It is also assumed the exposure of the activated carbon to the calcination temperature did not result in a significant mass change. It is observed in Table 7 that the calculated calcined SSACS activated carbon density significantly increases until the compaction force reaches about 400 pounds, after which the rate of density increase markedly slows. The Apparent Density of the carbon used to prepare these SSACS was 0.394 g/cc. At compaction forces at and above about 400 pounds it is observed that the granular activated carbon density within the SSACS is essentially the Apparent Density of the original granular activated carbon. At compaction forces of 800 and 1000 pounds the carbon density within the SSACS may be exceeding the Apparent Density of the original granular activated carbon. This result suggests that some crushing of the granular activated carbon used in the SSACS may be occurring. It should be noted that even if crushing of the granular activated carbon occurs during preparation of SSACS, such crushing should have no impact on the adsorption capacity although an increase in SSACS density and electrical conductivity may be observed. In any event, it is clearly shown by these results that it is possible, by use of this method, to make carbon SSACS having granular activated carbon densities as high as that of the starting, unbonded, granular activated carbon.

The average properties of the sets of SSACS prepared and characterized in the manner described above are given in Table 8. As shown in this Table, the "average calcined SSACS mass" and the "average calcined SSACS density" decrease with increasing "calcination temperature". These results are most likely due to the increased evolution of volatile material that would result from the carbonization/calcination of the binder at increasingly elevated temperatures. It is also observed that the "average calcined SSACS volume" appears to experience a very slight decrease with increasing calcination temperature. The total reduction across the entire range of calcination temperatures used (800° C.) is less than 6%. Such a small decrease suggests that the binder is not significantly located between the

TABLE 7

PROPERTIES OF SSACS PREPARED USING SELECTED COMPACTION FORCES

| sample set number | compaction force (lbs) | average calcined SSACS mass (g) | average calcined SSACS density (g/cc) | average calcined SSACS resistivity (mohm-cm) | average calcined SSACS crush strength (lbs) | calculated calcined SSACS activated carbon density (g/cc) |
|---|---|---|---|---|---|---|
| 3256-47 | 50 | 6.03 +/- 0.03 | 0.402 +/- 0.006 | 301 +/- 16 | 68 +/- 10 | 0.333 |
| 3256-46 | 100 | 6.05 +/- 0.03 | 0.422 +/- 0.007 | 305 +/- 11 | 98 +/- 15 | 0.349 |
| 3256-45 | 200 | 6.04 +/- 0.03 | 0.451 +/- 0.006 | 291 +/- 12 | 195 +/- 7 | 0.373 |
| 3256-44 | 300 | 6.03 +/- 0.00 | 0.462 +/- 0.006 | 296 +/- 11 | 235 +/- 13 | 0.385 |
| 3256-48 | 400 | 6.10 +/- 0.01 | 0.480 +/- 0.006 | 309 +/- 23 | 280 +/- 23 | 0.403 |
| 3256-49 | 600 | 6.10 +/- 0.01 | 0.492 +/- 0.011 | 298 +/- 22 | 316 +/- 33 | 0.403 |
| 3256-50 | 800 | 6.04 +/- 0.02 | 0.495 +/- 0.007 | 284 +/- 9 | 327 +/- 16 | 0.410 |
| 3256-51 | 1000 | 6.04 +/- 0.02 | 0.503 +/- 0.004 | 263 +/- 21 | 360 +/- 14 | 0.416 |

Example 8

SSACS were prepared using a 12×40 mesh granular activated carbon having an Apparent Density of 0.394 g/cc, a Mean Particle Diameter of 1.11 mm, and an Iodine Number of 1312 mg/g. The wetting solution used in the preparation of these SSACS was a 10.0% solution of diammonium hydrogen phosphate. The binder was wheat flour. The procedure used to prepare these SSACS was that given in Example 1 except for the following modifications. First, the mass of wetting solution used to prepare each SSACS was approximately 7.2 g. Second, the carbon-binder-wetting solution mixtures were compacted using 300 lbs of force. Third, the binder mass for each SSACS was approximately 3.00 g. Fourth, a Carver Model "C" Lab Press (Fred S. Carver Inc., P.O. Box 428, Menomonee Falls, Wis. 53051-0428) fitted with a 0 to 500 lbs load gauge was substituted for the Spring Dial Compression Gauge for the determination of crush strength. And fifth, the maximum elevated temperature to which each SSACS was exposed, referred to as calcination temperature, was one of the values listed in Table 8. Likewise, the time of exposure at each maximum temperature, referred to as calcination time, is given in Table 8. Also note that for the sake of simplicity, all the SSACS, after being exposed to the selected elevated temperature (regardless of the magnitude of that temperature), will be referred to as having been calcined and such exposure will be referred to as calcination.

The resistivity of the granular activated carbon described above was 1.49 ohm-cm as determined using the method given in Example 6. Also, the average calcined SSACS resistivity was determined using the method given in Example 6.

contact points of the granular activated carbon and thus does not prevent such contact points from coming into contact with each other.

Table 6 also shows the "average calcined SSACS resistivity", with one exception, decreases with respect to increasing calcination temperature. By far, the most electrically conductive SSACS are prepared at the highest calcination temperatures. Also note that the resistivities of the SSACS prepared using calcination temperatures at or greater than approximately 700° C. are lower than that of a packed bed of the unbonded granular activated carbon used in the preparation of these SSACS.

Finally, the "average calcined SSACS crush strength" exhibits a rather complex relationship with respect to "calcination temperature". It is possible that this complex relationship is a result several interacting effects. Such effects could include the following. The increase in crush strength observed for the calcination temperature increase of 200° C. to 300 ° C. is possibly a result of the first stages of carbonization imparting additional strength to the binder. The reduction in crush strength observed as the calcination temperature increases from 300° C. to 600° C. is possibly a result of the loss of binder mass due to the evolution of binder-derived volatile material. The relatively consistent crush strengths observed over the temperature ranges of 600° C. to 800° C. may indicate the binder is essentially fully carbonized in this temperature range. Finally, the increased crush strengths observed over the temperature range of 800° C. to 1000° C., if real and not a happenstance occurrence, may indicate the binder-derived char is undergoing a thermally induced rearrangement into a stronger char.

TABLE 8

PROPERTIES OF ACTIVATED CARBON SSACS PREPARED AT DIFFERENT CALCINATION TEMPERATURES

| sample set number | calcination temperature (degree C.) | calcination time (min) | average calcined SSACS mass (g) | average calcined SSACS volume (cubic inch) | average calcined SSACS density (g/cc) | average calcined SSACS resistivity (ohm-cm) | average calcined SSACS crush strength (lbs) |
|---|---|---|---|---|---|---|---|
| 3256-07 | 200 | 40 | 8.08 +/− 0.03 | 0.837 | 0.589 +/− 0.009 | 12.8 +/− 0.8 | 141 +/− 27 |
| 3256-08 | 300 | 40 | 6.99 +/− 0.02 | 0.823 | 0.518 +/− 0.014 | 3.45 +/− 0.37 | 371 +/− 49 |
| 3256-09 | 400 | 40 | 6.70 +/− 0.01 | 0.818 | 0.500 +/− 0.014 | 5.27 +/− 0.93 | 324 +/− 54 |
| 3256-10 | 500 | 40 | 6.51 +/− 0.02 | 0.822 | 0.484 +/− 0.005 | 4.56 +/− 0.29 | 229 +/− 21 |
| 3256-11 | 600 | 40 | 6.41 +/− 0.01 | 0.811 | 0.482 +/− 0.006 | 2.38 +/− 0.12 | 211 +/− 21 |
| 3256-12 | 700 | 40 | 6.32 +/− 0.02 | 0.807 | 0.478 +/− 0.007 | 1.12 +/− 0.05 | 216 +/− 9 |
| 3256-13 | 800 | 40 | 6.22 +/− 0.02 | 0.800 | 0.474 +/− 0.002 | 0.568 +/− 0.018 | 216 +/− 7 |
| 3256-14 | 900 | 20 | 6.06 +/− 0.02 | 0.806 | 0.460 +/− 0.010 | 0.361 +/− 0.013 | 231 +/− 19 |
| 3256-15 | 1000 | 20 | 6.01 +/− 0.02 | 0.790 | 0.464 +/− 0.004 | 0.253 +/− 0.010 | 241 +/− 13 |

Example 9

SSACS were prepared using a 12×40 mesh granular activated carbon having an Apparent Density of 0.394 g/cc, a Mean Particle Diameter of 1.11 mm, and an Iodine Number of 1312 mg/g. The wetting solution used in the preparation of these SSACS was a 10.0% solution of ammonium chloride. The binder was wheat flour. The procedure used to prepare these SSACS was that given in Example 1 except for the following modifications. First, the mass of wetting liquid used to prepare each SSACS was approximately 6.7 g. Second, the carbon-binder-wetting solution mixtures were compacted using 300 lbs of force. And third, the binder mass for each SSACS was approximately 3.00 g.

The average calcined mass of the six SSACS prepared in this manner was 5.87+/−0.01 g. These calcined SSACS also exhibited an average crush strength of 93+/−9 lbs, and an average density of 0.437+/−0.004 g/cc. The average Iodine Number of these six SSACS was 1086+/−3 mg/g.

As per the procedure given, each of these SSACS was prepared using 5.00 g of granular activated carbon. Assuming none of this granular activated carbon was lost during preparation, the calcined SSACS mass greater than 5.00 g is due to the carbonized/calcined binder and possibly some carbonization agent residue. It can be assumed that the carbonized/calcined binder contributes minimally, if at all, to the total activity of the activated carbon SSACS. Therefore, the average Iodine Number of the granular activated carbon in each SSACS would be the product of the average calcined SSACS Iodine Number times the average calcined SSACS mass divided by 5.00 g. This value (1086 mg/g * 5.87 g/5.00 g ) is then equal to 1275+/−6 mg/g. When this value is compared to the Iodine Number of the granular activated carbon (1312 mg/g), it is apparent that the granular activated carbon retained approximately 97% of its original activity after being formed into a SSACS.

Example 10

A large SSACS was prepared by first mixing 118.10 g of a granular activated carbon with 153.55 g of a 10.0% solution of diammonium hydrogen phosphate. The granular activated carbon was a nominal 12×20 mesh material exhibiting an Apparent Density of 0.507 g/cc and a Iodine Number of 1196 mg/g. After the aqueous solution was well-dispersed in and on the activated carbon, 94.48 g of wheat flour was added to the activated carbon-aqueous solution mixture. The activated carbon-wetting solution-wheat flour mixture was further mixed until the wheat flour and wetting solution were evenly dispersed through and on the carbon. The resultant semi-plastic mass was placed into the rectangular cavity of a metallic forming die. The rectangular cavity of this die body measured approximately 2.3 inches wide and approximately 5.3 inches long. Using this die, the semi-plastic material was compacted using a force of 3550 pounds applied for a time period of about three minutes. The direction of this force was perpendicular to the plane of the rectangular die body. After compaction and disassembly of the die, the resultant SSACS was then placed into an oven operating at approximately 100° C. to provide for overnight drying. Following drying, the dry uncalcined SSACS was placed into a stainless steel heat-treating bag ("Sen/pak", The Sentry Company, Foxboro MA) and calcined in a muffle furnace at approximately 950° C. under a substantially inert atmosphere for a furnace residence time period of approximately 1 hour. Note that the purpose of the stainless steel bag was to lessen the possibility of inadvertent exposure of the SSACS to air (oxygen) at elevated temperatures. Following calcination, the bagged SSACS was removed from the muffle furnace and placed into a cooling chamber. The SSACS was then cooled to approximately ambient temperature under a substantially inert atmosphere. For both calcination and cooling, the essentially inert atmosphere was provided by passing a stream of nitrogen gas through the muffle furnace or cooling chamber. The resultant SSACS massed 144.10 g. The dimensions of this SSACS were 2.27 inches wide, 5.17 inches long, and 1.36 inches high. The dimensions of the dry, uncalcined SSACS were 2.28, 5.27, and 1.38 respectively. Therefore the rectangular activated carbon SSACS experienced some slight shrinkage (~2%) during calcination. This SSACS had a very good, uniform, appearance and did not significantly degrade with repeated handling. This result demonstrates that it is possible to produce larger SSACS using the teachings of the present invention.

Example 11

A honeycomb-like SSACS was prepared by mixing 15.00 g of a 80×325 mesh granular activated carbon, 12.00 g of wheat flour, and 21.15 g of a 10.0% diammonium hydrogen phosphate solution. This mixture was stirred until a uniform semi-plastic mixture was obtained. This semi-plastic mixture was then placed into a cylindrical die having twenty-one ¼ inch rods spaced around and coaxially with the principal axis of the cylindrical die cavity, and an inner diameter on approximately 2.05 inches. These positions of these rods were fixed by appropriately machined recesses in the die rams. After placing the mixture in the die body, the mixture was compacted using 600 to 700 pounds of force. This force was applied to the mixture for approximately 3 minutes. The resulting formed structure was removed from the die and oven dried at overnight at approximately 100° C. The resulting dry structure was then placed into a lidded crucible, to inhibit inadvertent exposure to air, and heated at 950° C. for 30 minutes under essentially inert conditions. Following this heating the SSACS containing crucible was placed into a cooling chamber and cooled to near ambient temperatures under an essentially inert atmosphere. The resulting SSACS was cylindrical in shape, massing 18.8 g, and having an outer diameter of 1.9 inches and a height of 1.13 inches. Twenty-one ¼ inch diameter cylindrical holes were present in the SSACS. These holes were spaced around and coaxially with the principal axis of the cylindrical SSACS. The strength of the resultant SSACS was sufficient to withstand repeated handling. The appearance of the SSACS was judged to be very good with the SSACS exhibiting a uniform outer surface having no visible cracks. This result demonstrates that it is possible to produce honeycomb-like SSACS using the teachings of the present invention.

While the foregoing has been set forth in considerable detail, the examples and methods are presented for elucidation and not limitation. It will be appreciated from the specification that various modifications of the invention and combinations of elements, variations, equivalents, or improvements therein may be made by those skilled in the art, and are still within the scope of the invention as defined in the appended claims.

What is claimed is:

1. A method for producing self-supporting activated carbon structures, said method comprising the steps of:
   a) mixing a granular activated carbon, a binder material, a carbonization agent, and a liquid to produce a semi-plastic mixture, wherein said binder material includes ground cereal grain, cereal grain flour or tuber flour;
   b) compacting said mixture using compacting pressures of greater than or about 100 pounds per square inch to form a three-dimensional structure; and
   c) heating said structure to an elevated temperature of greater than or about 300° C. in an essentially inert or otherwise non-oxidizing atmosphere to produce said self-supporting activated carbon structure.

2. The method of claim 1 further including the addition of step d) cooling the self-supporting activated carbon structure to a temperature less than about 300° C. in an essentially inert or otherwise non-oxidizing atmosphere.

3. The method of claim 1 including drying said structure after compacting and prior to heating.

4. The method of claim 1 wherein said activated carbon has particle sizes less than about a No. 4 U.S. Sieve Series mesh size and greater than about a No. 325 U.S. Sieve Series mesh size.

5. The method of claim 1 wherein said granular activated carbon is pelleted or fibrous.

6. The method of claim 1 wherein said carbonization agent is solvated in said liquid prior to being mixed with said granular activated carbon and said binder material.

7. The method of claim 1 wherein said cereal grain is selected from the group consisting of wheat, corn, rye, oats, rice, barley and mixtures thereof.

8. The method of claim 1 wherein said cereal grain flour is wheat flour.

9. The method of claim 1 wherein said tuber flour is potato flour.

10. The method of claim 1 wherein said semi-plastic mixture of step a) is of uniform consistency.

11. The method of claim 1 wherein said liquid is water.

12. The method of claim 1 wherein said carbonization agent is selected from the group consisting of ammonium chloride, diammonium hydrogen phosphate, ammonium iodide, ammonium bromide, ammonium sulfate, ammonium dihydrogen phosphate, sulfuric acid and phosphoric acid, and mixtures thereof.

13. The method of claim 1 wherein step a) contains about five parts of said activated carbon for about each two to five parts of said binder material.

14. The method of claim 1 wherein step a) contains an amount of said liquid that is sufficient to wet said activated carbon and said binder material.

* * * * *